US009027318B2

(12) United States Patent
Akahane

(10) Patent No.: US 9,027,318 B2
(45) Date of Patent: May 12, 2015

(54) REEL LAWN MOWER WITH MAIN BODY, REEL CUTTING UNIT, AND CONNECTION STRUCTURE FOR CONNECTING REEL CUTTING UNIT TO MAIN BODY SUCH THAT REEL CUTTING UNIT IS ROLLABLE

(71) Applicant: IHI Shibaura Machinery Corporation, Matsumoto-shi, Nagano (JP)

(72) Inventor: Kazunari Akahane, Nagano (JP)

(73) Assignee: Ihi Shibaura Machinery Corporation, Matsumoto-shi, Nagano (JP)

( * ) Notice: Subject to any disclaimer, the term of this patent is extended or adjusted under 35 U.S.C. 154(b) by 165 days.

(21) Appl. No.: 13/759,275

(22) Filed: Feb. 5, 2013

(65) Prior Publication Data

US 2013/0199147 A1 Aug. 8, 2013

(30) Foreign Application Priority Data

| Feb. 7, 2012 | (JP) | 2012-024485 |
| Jun. 22, 2012 | (JP) | 2012-140316 |
| Jun. 22, 2012 | (JP) | 2012-140317 |

(51) Int. Cl.
*A01D 34/53* (2006.01)
*A01D 34/47* (2006.01)
*A01D 34/54* (2006.01)

(52) U.S. Cl.
CPC ............... *A01D 34/47* (2013.01); *A01D 34/54* (2013.01)

(58) Field of Classification Search
USPC ............................. 56/249, 294, 10, 5, 3, 14.9
See application file for complete search history.

(56) References Cited

U.S. PATENT DOCUMENTS

| 4,021,996 | A | * | 5/1977 | Bartlett et al. | 56/7 |
| 4,769,976 | A | * | 9/1988 | Bassett et al. | 56/7 |
| 5,193,330 | A | * | 3/1993 | Nusser | 56/6 |
| 5,293,729 | A | * | 3/1994 | Curry et al. | 56/7 |
| RE34,921 | E | * | 5/1995 | Lamusga et al. | 56/7 |
| 5,533,326 | A | * | 7/1996 | Goman et al. | 56/7 |
| 5,623,817 | A | * | 4/1997 | Bricko et al. | 56/7 |
| 5,628,169 | A | * | 5/1997 | Stiller et al. | 56/7 |

(Continued)

FOREIGN PATENT DOCUMENTS

| JP | 6443104 A | 2/1989 |
| JP | 01042405 Y2 | 12/1989 |

(Continued)

OTHER PUBLICATIONS

Japanese Office Action dated Apr. 30, 2014 in counterpart Japanese Application No. 2012-140316.

(Continued)

*Primary Examiner* — Árpád Fábián-Kovács
(74) *Attorney, Agent, or Firm* — Holtz, Holtz, Goodman & Chick PC

(57) ABSTRACT

A reel lawn mower which has a connection structure for connecting a reel cutting unit to a main body. The reel cutting unit has a spiral cutting reel which is rotated by a prime mover to cut grass together with a bedknife. In the connection structure, in order to connect the reel cutting unit to the main body so that the reel cutting unit rolls around a virtual horizontal line perpendicular to the shaft center of the cutting reel in the center of the axial direction of the cutting reel, the reel cutting unit includes a connecting arm with an arc portion shaped so as to follow a virtual arc centered on the virtual horizontal line. The connecting arm is slidably supported so as to prevent the arc portion from coming off the virtual arc.

19 Claims, 22 Drawing Sheets

(56) References Cited

U.S. PATENT DOCUMENTS

| | | | |
|---|---|---|---|
| 6,044,631 A * | 4/2000 | Anderson et al. | 56/7 |
| 6,047,530 A * | 4/2000 | Bednar | 56/6 |
| 6,098,388 A * | 8/2000 | Davies | 56/249 |
| 6,131,379 A * | 10/2000 | Ehn, Jr. | 56/15.7 |
| 6,336,312 B1 * | 1/2002 | Bednar et al. | 56/6 |
| 6,341,478 B1 * | 1/2002 | Sallstrom et al. | 56/7 |
| 6,412,258 B1 * | 7/2002 | Doerflinger | 56/7 |
| 6,487,837 B1 * | 12/2002 | Fillman et al. | 56/11.9 |
| 6,622,464 B2 * | 9/2003 | Goman et al. | 56/16.9 |
| 6,698,171 B2 * | 3/2004 | Doerflinger | 56/7 |
| 6,802,175 B2 * | 10/2004 | Fillman et al. | 56/11.9 |
| 7,121,071 B2 | 10/2006 | Berkeley | |
| 7,191,584 B2 | 3/2007 | Goman et al. | |
| 7,395,652 B2 * | 7/2008 | Goman et al. | 56/249 |
| 7,448,193 B2 * | 11/2008 | Derby | 56/249 |
| 7,478,519 B2 * | 1/2009 | Phillips | 56/15.9 |
| 7,677,017 B2 * | 3/2010 | Holby | 56/10.6 |
| 7,748,204 B2 * | 7/2010 | Goman et al. | 56/249 |
| 7,841,158 B2 * | 11/2010 | Wilson | 56/7 |
| 7,845,152 B2 * | 12/2010 | Surridge et al. | 56/199 |
| 7,971,421 B2 * | 7/2011 | Goman et al. | 56/249 |
| 8,136,334 B2 * | 3/2012 | Rinholm et al. | 56/249 |
| 8,261,522 B2 * | 9/2012 | Coffin et al. | 56/249 |
| 8,261,523 B2 * | 9/2012 | Patton | 56/249 |
| 8,544,251 B2 * | 10/2013 | Goman et al. | 56/249 |
| 2006/0123761 A1 | 6/2006 | Goman et al. | |
| 2011/0179759 A1 * | 7/2011 | Goman et al. | 56/253 |
| 2013/0312380 A1 * | 11/2013 | Goman et al. | 56/7 |

FOREIGN PATENT DOCUMENTS

| | | |
|---|---|---|
| JP | 02042902 A | 2/1990 |
| JP | 03133309 A | 6/1991 |
| JP | 2005-328838 A | 12/2005 |

OTHER PUBLICATIONS

Japanese Office Action dated Apr. 30, 2014 in counterpart Japanese Application No. 2012-140317.

* cited by examiner

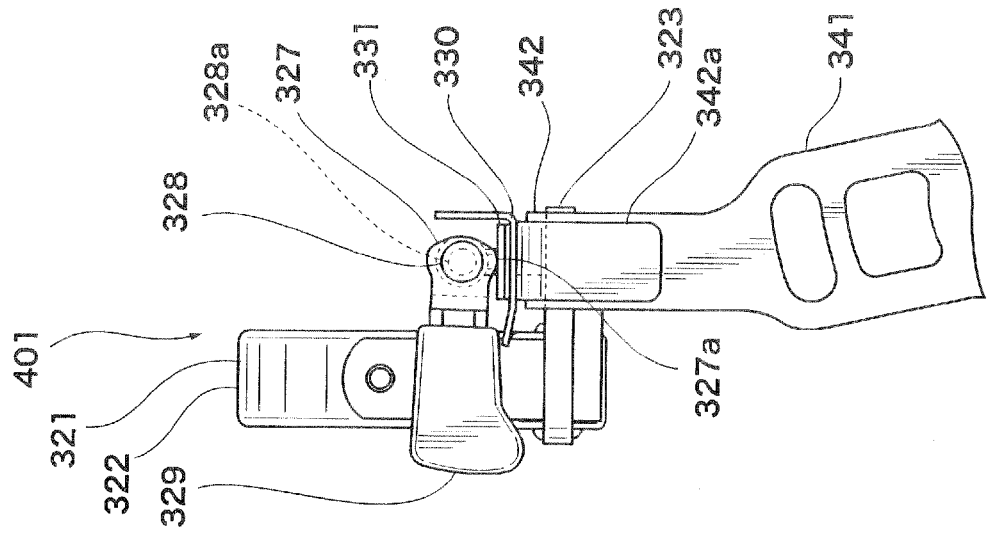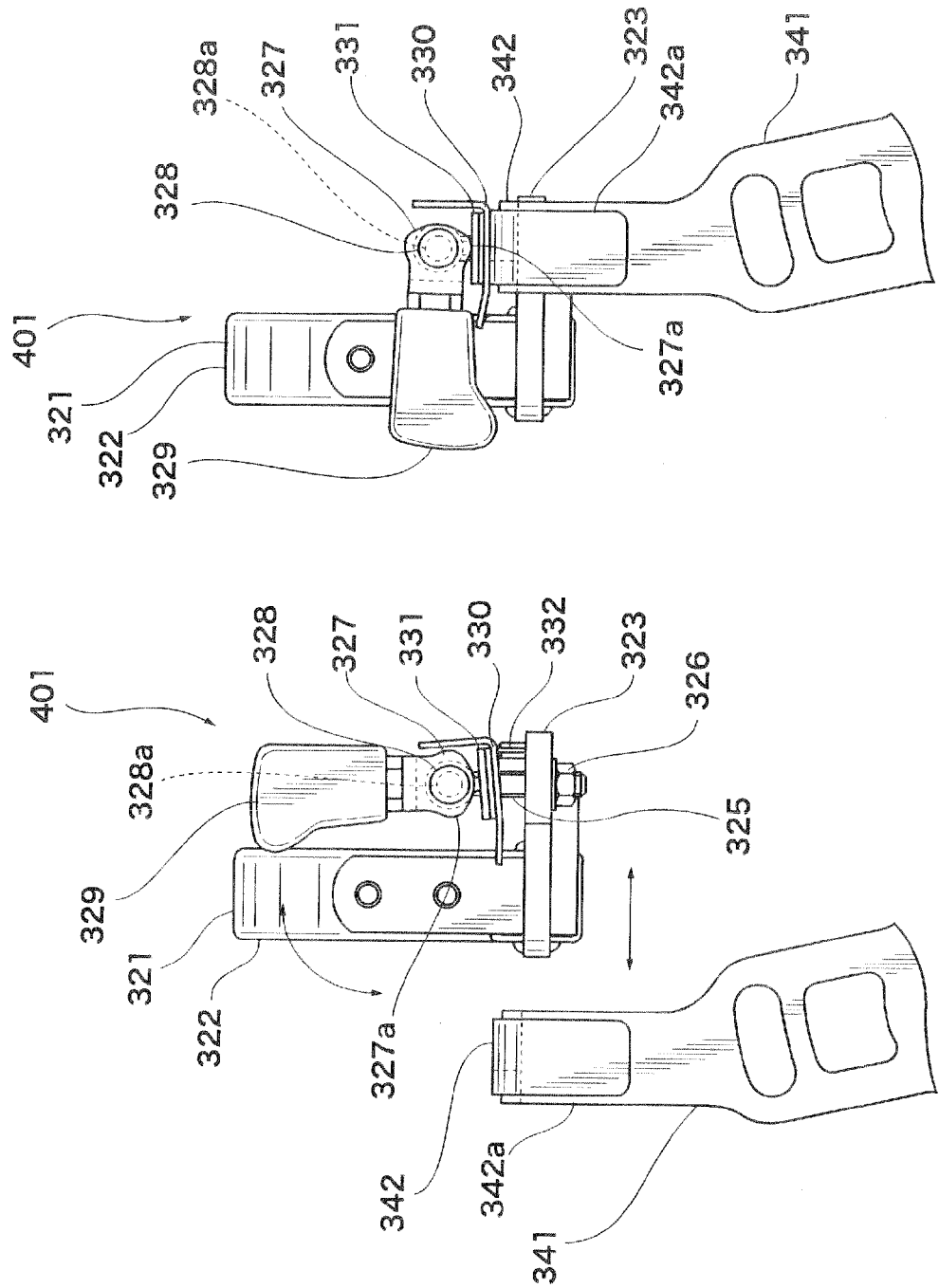

REEL LAWN MOWER WITH MAIN BODY, REEL CUTTING UNIT, AND CONNECTION STRUCTURE FOR CONNECTING REEL CUTTING UNIT TO MAIN BODY SUCH THAT REEL CUTTING UNIT IS ROLLABLE

CROSS-REFERENCE TO RELATED APPLICATION

The present application is based on and claims the benefit of priority of Japanese Patent Applications P2012-024485 filed on Feb. 7, 2012, P2012-14031 filed on Jun. 22, 2012 and P2012-140317 filed on Jun. 22, 2012, the entire contents of which are incorporated herein by reference.

BACKGROUND OF THE INVENTION

1. Field of the Invention

The present invention relates to reel lawn mowers which mow a lawn on a golf course, garden or square and more particularly to a reel lawn mower which has a reel cutting unit connected to a main body with a prime mover such as an engine or a motor.

2. Description of Related Art

Some reel lawn mowers have a main body with an engine and a reel cutting unit separate from the main body. See JP-A-2005-328838 and U.S. Pat. No. 7,191,584. The reel cutting unit includes a pair of front and rear rollers in its running direction with a spiral cutting reel between the rollers. The cutting reel is rotated by the engine of the main body as a power source to mow a lawn by contact with a bedknife provided in the reel cutting unit. In mowing, the pair of rollers determine the height of the cutting reel from the ground surface and fix the height of grass cutting by the cutting reel and bedknife. The height of the cutting reel from the ground surface can be changed to set a desired grass cutting height, by adjusting the height of at least one of the pair of rollers, for example, the front roller located forward in the running direction. See Paragraph 0010 of JP-A-2005-328838 and the 1st to 7th lines of the 9th section of U.S. Pat. No. 7,191,584.

A lawn mower in which a reel cutting unit is connected to a main body enables pitching and rolling of the reel cutting unit with respect to the main body.

For example, in the lawn mower described in JP-A-2005-328838, pitching and rolling motions of the reel cutting unit (designated by reference sign 14 in JP-A-2005-328838) can be made by a rotation mechanism 16 shown in FIG. 1 (see Paragraph 0009 of JP-A-2005-328838). However, JP-A-2005-328838 only describes that the reel cutting unit 14 is indirectly connected to the main body 12 through a rotation mechanism 16 and does not describe further details.

On the other hand, U.S. Pat. No. 7,191,584 describes a structure which enables pitching and rolling of a reel cutting unit (reel cutting unit 18) with respect to a main body (frame 4) in more detailed form (see the 13th line of the 9th section to the 4th line of the 11th section and FIG. 3 and FIGS. 7 to 10 of U.S. Pat. No. 7,191,584). Specifically, in the lawn mower described in U.S. Pat. No. 7,191,584, a pair of support arms 38 are located on both sides of a reel cutting unit and a pipe crossbar joint 36 is rotatably located between the support arms 38. In this lawn mower, the main body is connected to the crossbar joint 36 through a pair of links 42 to connect the main body and reel cutting unit. The pair of links 42 are connected to the main body and crossbar joint 36 rotatably around an axis parallel to the running direction of the lawn mower, thereby enabling rolling of the reel cutting unit. Pitching of the reel cutting unit is achieved by rotation of the crossbar joint 36 with respect to the pair of links 42.

The pitching and rolling motions of the reel cutting unit with respect to the main body are very important in order to enable the reel cutting unit to follow the ground surface undulation during its running and keep the height of the cutting reel above the ground surface constant to stabilize the grass cutting height. However, the lawn mower described in JP-A-2005-328838 has a serious problem about the rolling motion of the reel cutting unit. The problem is explained below referring to FIGS. 21A to 21C and 22A to 220. In FIGS. 21A to 21C and 22A to 22C, GR represents a turf ground surface and RC represents a cutting reel.

As shown in FIGS. 21A to 21C, in the lawn mower described in JP-A-2005-328838, the reel cutting unit rotates around the rotation mechanism (designated by reference sign 16 in the document), so rotation center RA of the reel cutting unit during rolling is above the cutting reel RC. With the rotation center RA in such a position, when the ground surface GR is inclined right upward (FIG. 21B) from the horizontal level (FIG. 21A) or left upward (FIG. 21C), rolling of the reel cutting unit may cause the rising portion of the cutting reel RC to break into the sod and cause bite S. The direction of inclination of the ground surface GR (right upward and left upward) is the direction as seen from the front of the lawn mower.

Theoretically, however, "bite" seems unlikely to occur since the pair of rollers of the reel cutting unit determine the height of the cutting reel from the ground surface.

During rolling, since the reel cutting unit rotates around the rotation center RA above the cutting reel RC, it moves toward the direction of upward inclination of the ground surface. This causes the portions of the rollers of the reel cutting unit in contact with the upwardly inclined ground surface to break into the ground GR, which reduces the clearance there between the ground surface GR and cutting reel RC and finally causes bite S into the sod. Particularly in the case of a golf course green, since the grass cutting height must be in the range of 2.0 to 5.0 mm and the clearance between the ground surface GR and cutting reel RC should be very small, bite S is likely to occur when the ground surface is inclined considerably.

The lawn mower described in U.S. Pat. No. 7,191,584 claims to suppress the cutting reel RC's bite S into the sod as mentioned above (see the 31st to 39th lines of the 10th section of U.S. Pat. No. 7,191,584). For that purpose, as shown in FIGS. 22A to 22C, rotation center RA ("a focal point F" in U.S. Pat. No. 7,191,584) of the reel cutting unit in rolling is sot at the same level as the height of the bedknife ("a bedknife 24" in U.S. Pat. No. 7,191,584) in contact with the cutting reel RC (see the 17th to 19th lines and 42nd to 65th lines of the 9th section of U.S. Pat. No. 7,191,584). In this respect, U.S. Pat. No. 7,191,584 also described that the rotation center RA ("focal point F") of the reel cutting unit may be on the ground surface GR or slightly below the ground surface GR (see the 40th to 52nd lines of the 10th section of U.S. Pat. No. 7,191,584).

When the rotation center RA of the reel cutting unit in rolling is at the same level as the height of the bedknife in contact with the cutting reel RC, it is true that bite S into the sod as illustrated in FIGS. 21B and 21C can be prevented.

However, bite S into the sod is prevented in this way only in the initial state in which the rotation center RA of the reel cutting unit is at the same level as the height of the bedknife or slightly below it. The present inventor has found that as a lawn mower like the one described in U.S. Pat. No. 7,191,584 deteriorates over time in which the rotation center RA of the reel cutting unit is at the same level as the height of the bedknife, bite S into the sod may occur at the lowered portion of the cutting reel opposite to its portion lifted by rolling of the reel cutting unit RC (see FIGS. 22B and 22C). An investigation of the reason has revealed that due to deterioration over time the rotation center RA of the reel cutting unit gradually goes down from the height of the bedknife and finally goes down further from the ground surface GR (see the arrows in FIGS. 22A, 22B, and 22C). If the rotation center RA of the reel cutting unit is below the ground surface GR, the reel cutting unit in rolling will move toward the direction of downward inclination of the ground surface. This causes the portions of the pair of rollers of the reel cutting unit in contact with the downwardly inclined ground surface to break into the ground surface GR, which reduces the clearance there between the ground surface GR and cutting reel RC and causes bite S into the sod.

What is the reason that due to deterioration over time the rotation center RA of the reel cutting unit gradually goes down from the height of the bedknife and finally becomes below the ground surface GR? It is lapping of the cutting reel RC. As the cutting reel RC is used overt time, its cutting edge becomes dull, so its original sharpness must be restored by frequent lapping. As a result, the diameter of the cutting reel RC gradually decreases. When the diameter of the cutting reel RC gradually becomes smaller, in order to keep the initial clearance between the ground surface CR and cutting reel RC, the height of at least one of the rollers of the reel cutting unit, for example the front roller in the running direction, must be decreased by about one half of the amount equivalent to the decrease in the diameter of the cutting reel RC. In the process of decreasing the height, there occurs a phenomenon that the rotation center RA of the reel cutting unit becomes below the bedknife. If this process is repeatedly carried out, the rotation center RA of the reel cutting unit will further go down from the ground surface GR.

The present invention has been made in view of this problem and has an object to prevent the cutting reel's bite into the sod which may occur depending on the ground undulation while the reel cutting unit is rolling.

SUMMARY OF THE INVENTION

According to an aspect of the present invention, a reel lawn mower is provided which includes: (i) a main body of which a running direction is determined; (ii) reel cutting unit connected to the main body and located on a front side in the running direction; (iii) a pair of rollers which are located on the reel cutting unit rotatably around a horizontal axis perpendicular to the running direction to support the reel cutting unit at front and rear positions thereof in the running direction; (iv) a spiral cutting reel which is located on the reel cutting unit between the pair of rollers rotatably around the horizontal axis perpendicular to the running direction; (v) a bedknife which is located on the reel cutting unit and touches the cutting reel under rotation and mows a lawn together with the cutting reel; and (vi) a connection structure which connects the reel cutting unit to the main body so that the reel cutting unit rolls around a virtual center point which is in a vertical projection plane covering the cutting reel with a diameter reduced to the limit for use and located in the center of the axial direction of the cutting reel, as a rotation center.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 18A is a side view of the unit attachment block according to the embodiment, in which the connecting arm and bracket are separated from each other;

FIG. 18B is a side view of the unit attachment block according to the embodiment, in which the connecting arm and bracket are connected;

DETAILED DESCRIPTION OF THE PREFERRED EMBODIMENTS

The content of the description is as follows:
1. General Structure
2. Connection Structure
3. Unit Attachment. Block
4. Operation
   (1) Basic operation
   (2) Grass cutting height and lapping
   (3) Bite into the sod
   (4) Structure which determines the rotation center of the reel cutting unit
   (5) Attachment/detachment of the reel cutting unit
      (a) Basic operation
      (b) Arrangement of a pair of pinching parts and the connecting portion
      (c) Plate cams
      (d) Fitting grooves
      (e) Pushers
      (f) Spring pins (elastic member) and the bent portion of the guide plate
      (g) A pair of unit attachment blocks 5. Variations
   (1) Variations of the connection structure
   (2) Variations of the unit attachment block
   (3) Others An embodiment of the present invention will be explained with reference to the drawings. This embodiment is an example of application of the invention to a reel lawn mower 11 which is suitable for lawn mowing on a golf course, particularly a green.

Figure 20A:
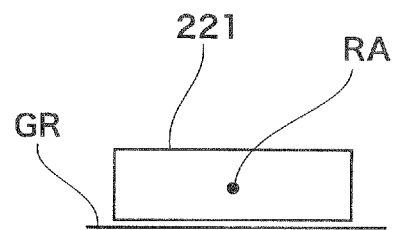
FIG. 20A is a schematic diagram showing a clearance between the ground surface and the cutting reel of the reel lawn mower according to the embodiment, in which the reel cutting unit is placed on a flat surface.
Figure 20B:
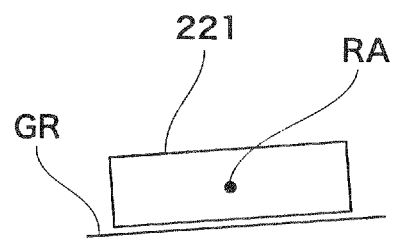
FIG. 20B is a schematic diagram showing clearance between the ground surface and the cutting reel of the reel lawn mower according to the embodiment, in which the reel cutting unit is placed on a surface inclined right up.
Figure 20C:
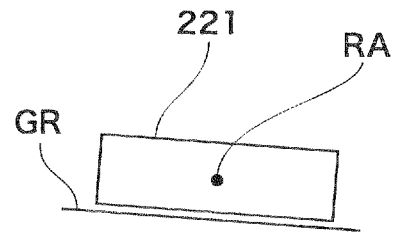
FIG. 20C is a schematic diagram showing clearance between the ground surface and the cutting reel of the reel lawn mower according to the embodiment, in which the reel cutting unit is placed on a surface inclined left up.
Figure 21A:
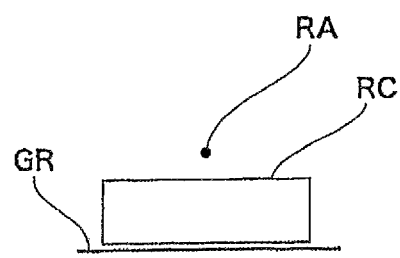
FIG. 21A is a schematic diagram showing a clearance between the ground surface and the cutting reel of a conventional reel lawn mower with the rotation center of its reel cutting unit in a higher position, in which the reel cutting unit is placed on a flat surface.
Figure 21B:
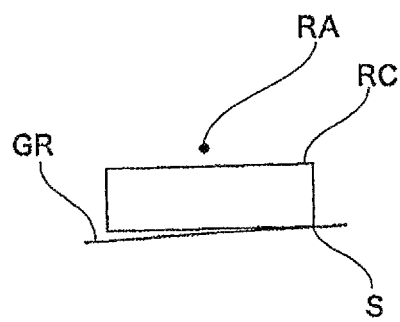
FIG. 21B is a schematic diagram showing a clearance between the ground surface and the cutting reel of the conventional reel lawn mower with the rotation center of its reel cutting unit in a higher position, in which the reel cutting unit is placed on a surface inclined right up.
Figure 21C:
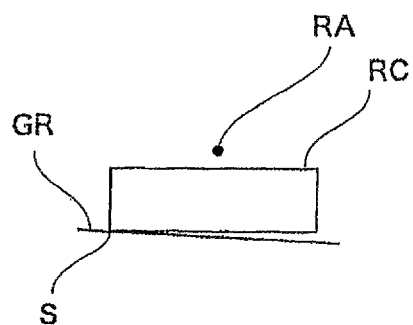
FIG. 21C is a schematic diagram showing clearance between the ground surface and the cutting reel of the conventional reel lawn mower with the rotation center of its reel cutting unit in a higher position, in which the reel cutting unit is placed on a surface inclined left up.
Figure 22A:
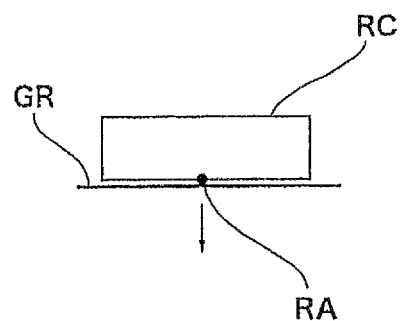
FIG. 22A is a schematic diagram showing a clearance between the ground surface and the cutting reel of a conventional reel lawn mower with the rotation center of its reel cutting unit in a lower position, in which the reel cutting unit is placed on a flat surface.
Figure 22B:
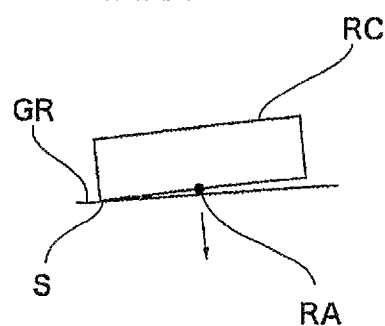
FIG. 22B is a schematic diagram showing a clearance between the ground surface and the cutting reel of the conventional reel lawn mower with the rotation center of its reel cutting unit in a lower position, in which the reel cutting unit is placed on a surface inclined right up.
Figure 22C:
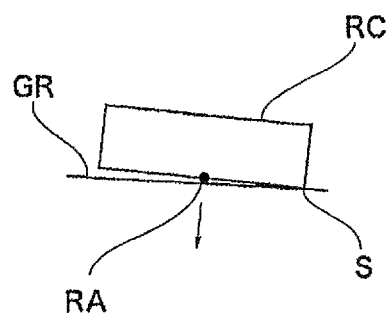
FIG. 22C is a schematic diagram showing a clearance between the ground surface and the cutting reel of the conventional reel lawn mower with the rotation center of its reel cutting unit in a lower position, in which the reel cutting unit is placed on a surface inclined left up.

In this embodiment, reference is made to inclination of the ground surface GR (see FIGS. 20A to 20C). The ground surface may be inclined right up (FIG. 20B) or left up (FIG. 20C). The directions of inclination (right and left up) mean not directions as seen from the operator of the lawn mower 11 but directions as seen from the front of the lawn mower 11.

1. General Structure

As shown in FIGS. 1 to 4, the lawn mower 11 according to this embodiment is mainly comprised of a main body 101 and a reel cutting unit 201 and operated by an operator behind it who holds it. The reel cutting unit 201 is connected to the main body 101 and located in front of it.

Figure 2:
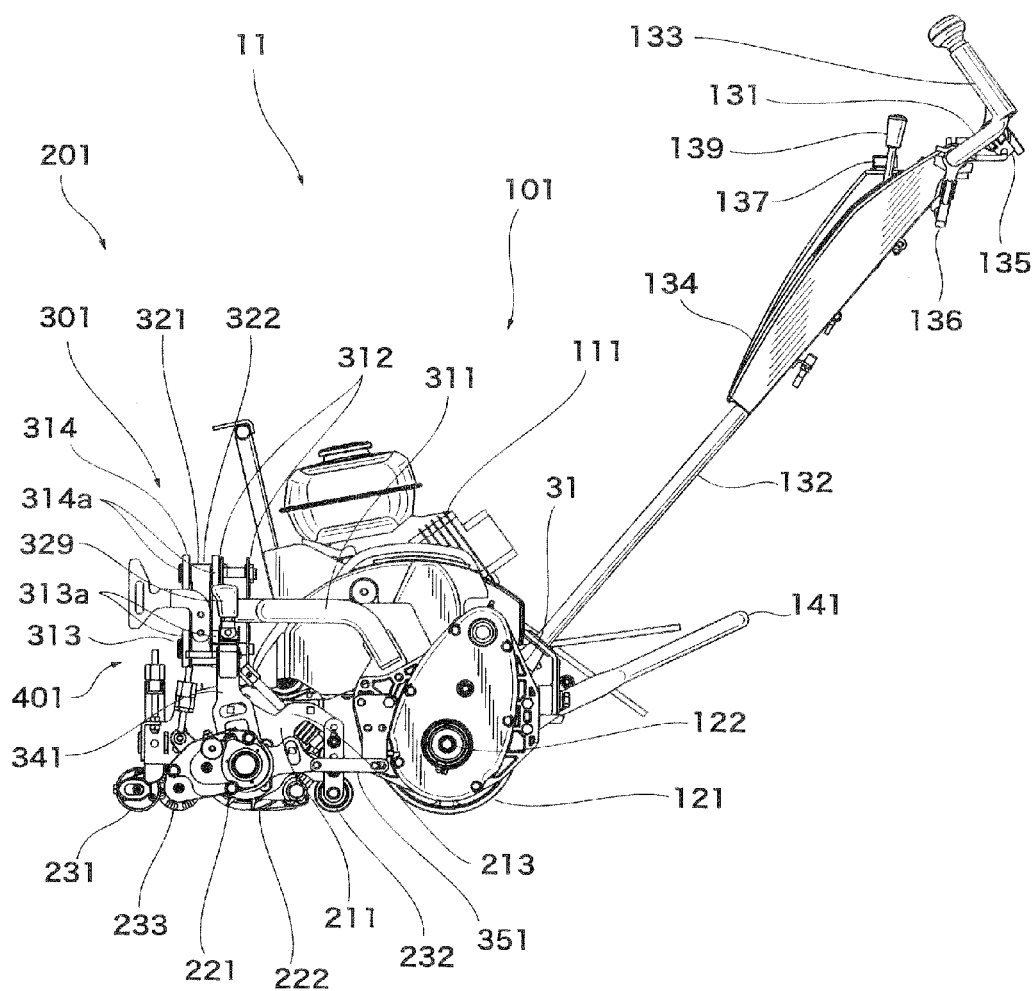
FIG. 2 is a side view of the whole reel lawn mower according to the embodiment.
Figure 3:
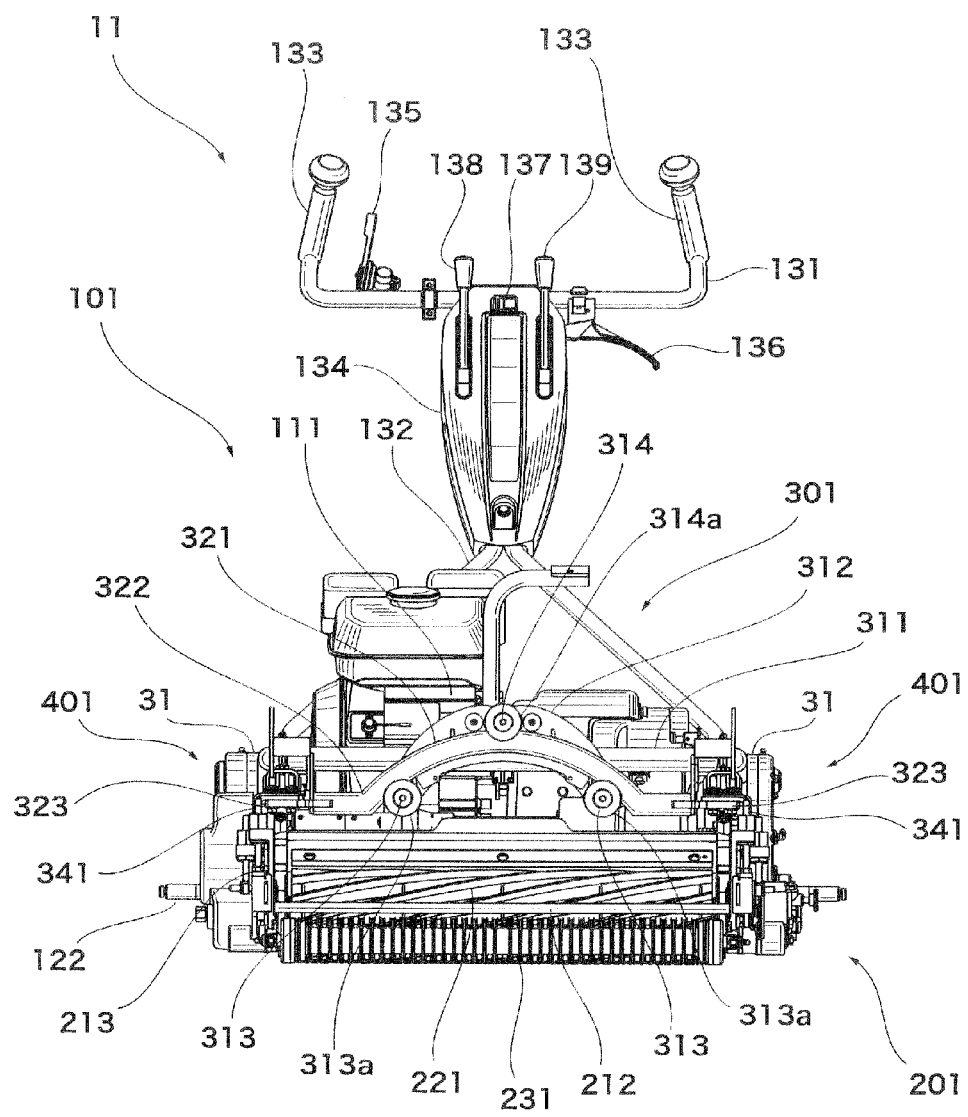
FIG. 3 is a front view of the whole reel lawn mower according to the embodiment.

The main body 101 includes a prime mover 111 mounted thereon and can be moved by a pair of drive rollers 121 (running wheel) to which motive power is transmitted from the prime mover 111. This embodiment uses an engine for the prime mover 111. A motor can be used for the prime mover 111 as other embodiment. The motive power from the engine 111 is transmitted through a clutch and speed change gear (both not shown) to drive shafts 122 of the pair of drive rollers 121. A pair of running tires (not shown) can be attached as a pair of running wheels onto the drive shaft 122. The direction of movement of the main body 101 is determined by the running wheels, namely the drive rollers 121 or running tires. In FIG. 2, the left is a forward running direction and the right is a backward running direction.

A handle 131 is attached to the main body 101. The handle 131 is fixed on the upper ends of handle arms 132 extending upward and obliquely backward from both sides of the back of the main body 101. The handle arms 132 are fixed on a pair of main body frames 31 of the main body 101 (see FIG. 4). Both ends of the handle 13 are grips 133 for the operator to hold from behind the lawn mower 11. The pair of left and right grips 133 extend upward and obliquely forward so that the operator can easily hold them.

The lawn mower 11 is mostly operated using the handle 131 and an operation box 134. The operation box 134 is fixed on the handle arms 132, covering the joint between the handle arms 132 and the handle 131. The handle 131 is provided with a throttle lever 135 and a brake lever 136. The throttle lever 135 and brake lever 136 are located on the right and left respectively when seen from the operator holding the grips 133. Provided on the operation box 134 are an engine switch 137, a main clutch lever 138, and a cutting reel clutch lever 139. The engine switch 137 is a switch to start or stop the engine 111. It is turned on to start the engine and turned off to stop the engine. The main clutch lever 138 is used to select whether to transmit the motive power from the engine 111 to the various parts. The cutting reel clutch lever 139 is used to select whether to start or stop the cutting reel 221 (see FIGS. 1 to 5C) of the reel cutting unit 201. When seen from the operator holding the grips 133, the main clutch lever 138 and the cutting reel clutch lever 139 are located on the right and left respectively. The engine switch 137 is located above and between the main clutch lever 138 and the cutting reel clutch lever 139.

The U-shaped pipe member on the back of the lawn mower 11 which is located under the handle arms 132 is a stand 141.

Figure 1:
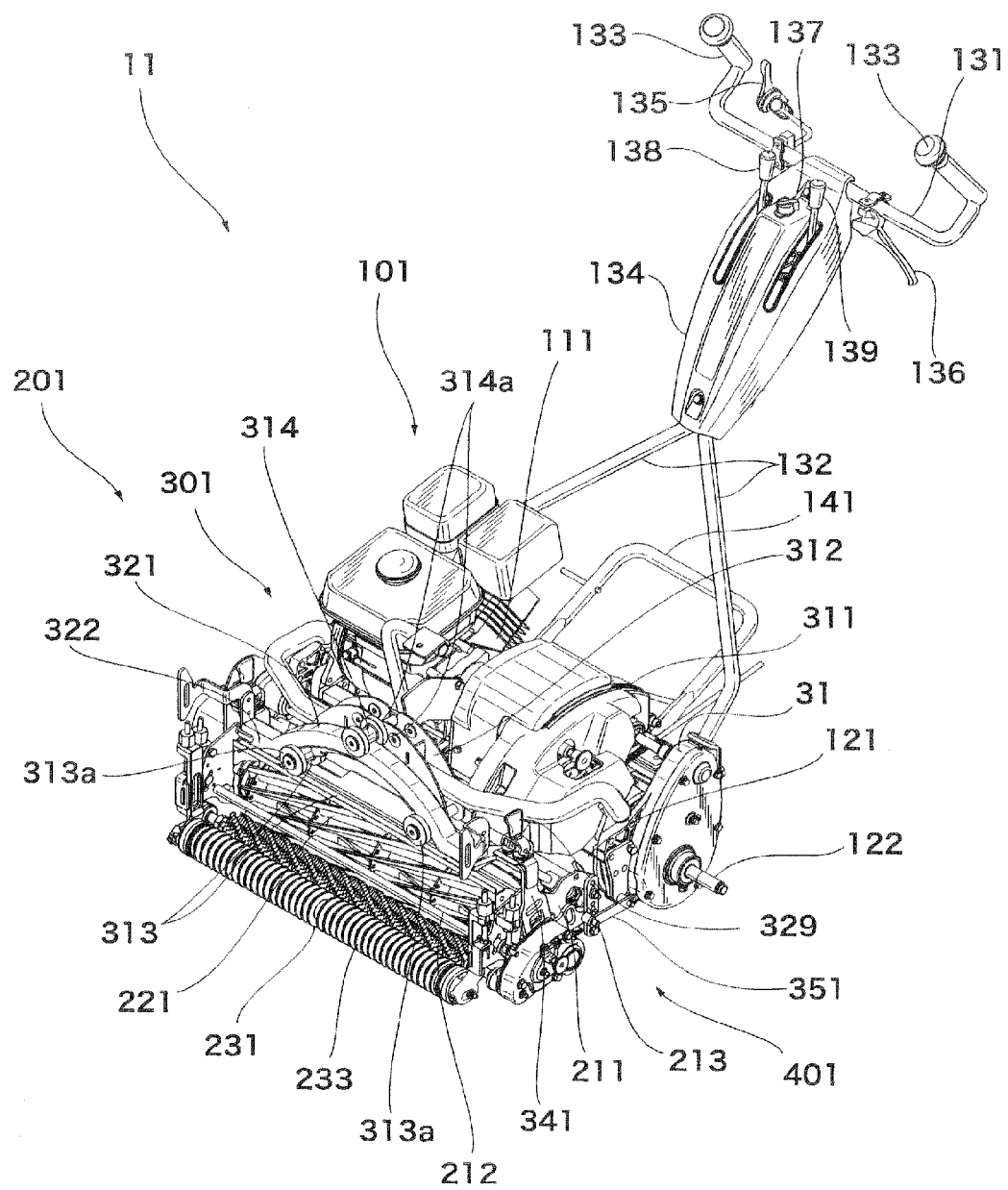
FIG. 1 is a perspective view of a reel lawn mower according to an embodiment of the present invention.

FIGS. 1 and 2 show that the stand 141 is in its up position. As the operator steps on the stand 141 with his/her foot, it is set in its vertical position to hold the lawn mower 11 in a stable state.

The reel cutting unit 201 includes a unit frame 213 which has a pair of left and right frame plates 211 connected and fixed by plural connecting members 212. The unit frame 213 has a spiral cutting reel 221 rotatably fitted between the pair of frame plates 211. The unit frame 213 also includes a bedknife 222 which touches the cutting reel 221 at the lowest point of the cutting reel 221. The cutting reel 221 under rotation engages with the bedknife 222 to mow a lawn. The pressure of contact of the bedknife 222 with the cutting reel 221 can be adjusted freely in order to optimize the sharpness in grass cutting by the cutting reel 221 and bedknife 222 engaging with each other.

The reel cutting unit 201 includes a pair of rollers (front roller 231 and rear roller 232) in the running direction of the lawn mower 11. These rollers are rotatably fitted to the unit frame 213 to support the reel cutting unit 201 movably. The front roller 231 is located ahead of the cutting reel 221 in the running direction and the rear roller 232 is located behind the cutting reel 221 in the running direction. The height of the front roller 231 is adjustable.

The unit frame 213 also includes a working roller 233 between the front roller 231 and the cutting reel 221. The working roller 233 is intended to remove dead grass, uniform the grain of grass and send the grass to the cutting reel 221. A grooming cutter, thatching reel, and brush reel are attachable and any one among them can be attached as the working roller 233.

The cutting reel 221, pair of rollers (front roller 231 and rear roller 232) and working roller 233 all rotate around horizontal axes perpendicular to the running direction of the reel cutting unit 201. Among these rotary members, the cutting reel 221 and working roller 233 are rotated by motive power transmitted from the engine 11.

The reel cutting unit 201 is connected to the main body 101 by connection structure 301. The connection structure 301 connects the reel cutting unit 201 to the main body 101 so as to enable pitching and rolling motion of the unit.

The connection structure 301 includes a pair of unit attachment blocks 401. The pair of unit attachment blocks is provided on each of left and right sides of the reel cutting unit 201. The unit attachment block 401 allows the reel cutting unit 201 to be attached to, or detached from, the main body 101 easily in a simple manner.

2. Connection Structure

First, the portion of the connection structure 301 which is located on the main body 101 will be described.

As shown in FIGS. 1 to 4 and FIGS. 5A, 5B, and 5C, a lift arm 311 is provided on the front portion of the main body 101. The lift arm 311 is a pipe member which extends forward from both the sides of the main body 101 and surrounds the front portion of the main body 101. More specifically, the lift arm 311 has fixing pieces 311a at both its ends and these fixing pieces 311a are screwed on the main body frames 31 of the main body 101 with bolts B1 through washers W1 (see FIG. 4). The lift arm 311 extends upward toward the front of the lawn mower 11 from the main body frames 31 where it is fixed, and then stretches horizontally to surround the front portion of the main body 101 horizontally (see FIG. 2).

The lift arm 311 has a pair of lift plates 312 fixed on its horizontal portion surrounding the front portion of the main body 101. These lift plates 312 are both plate members which have the same arc shape and size and are located in a way to sandwich the lift arm 311. The pair of lift plates 312 have a pair of support studs 313 fixed on the left and right downward-extending ends thereof and a holddown stud 314 fixed on the uppermost center portions thereof. The support studs 313 and holddown stud 314 are cylindrical bar-like members, namely stud pins, with their axes oriented in the front-back direction of the lawn mower 11.

Figure 4:
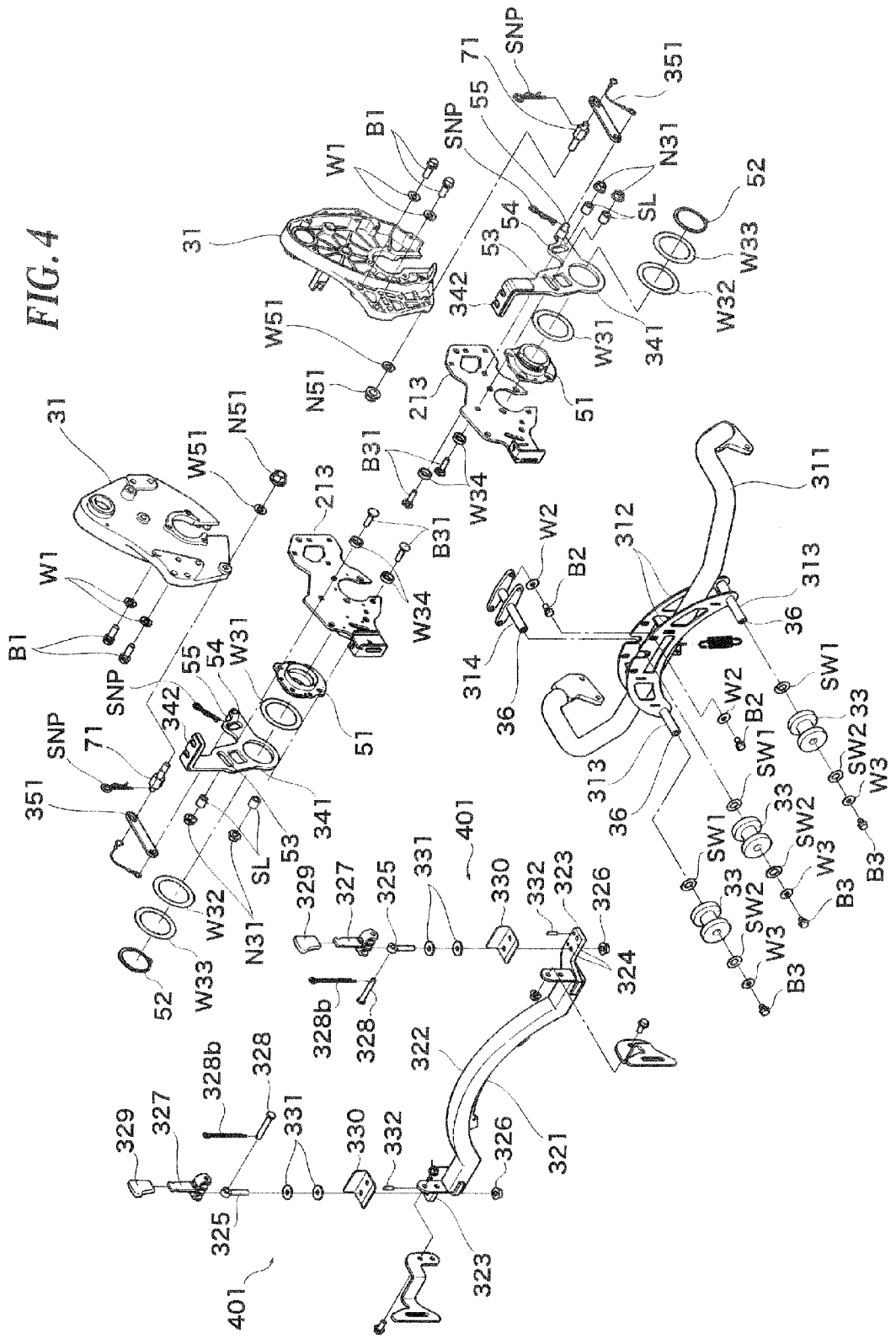
FIG. 4 is an exploded perspective view of a structure for connecting a main body frame and a reel cutting unit frame according to the embodiment.
Figure 6:
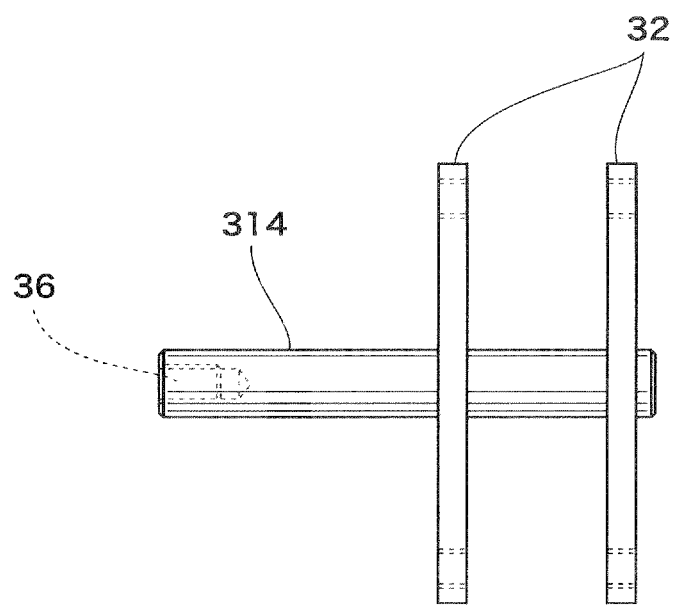
FIG. 6 is a plan view of a stud pin as a bar-like connecting member according to the embodiment.

As shown in FIG. 4, the pair of support studs 313 are fixed on the pair of lift plates 312 by welding. The holddown stud 314 is fixed on the pair of lift plates 312 with bolts B2 through washers W2. As shown in FIG. 6, the holddown stud 314 has a pair of stud frames 32 fixed by welding. The bolts B2 fix the stud frames 32 on the lift plates 312. Although FIG. 4 shows only two pairs of washers W2 and bolts B2, four pairs of washers W2 and bolts B2 are used to fix the holddown stud 314 on the lift plates 312.

Figure 7:
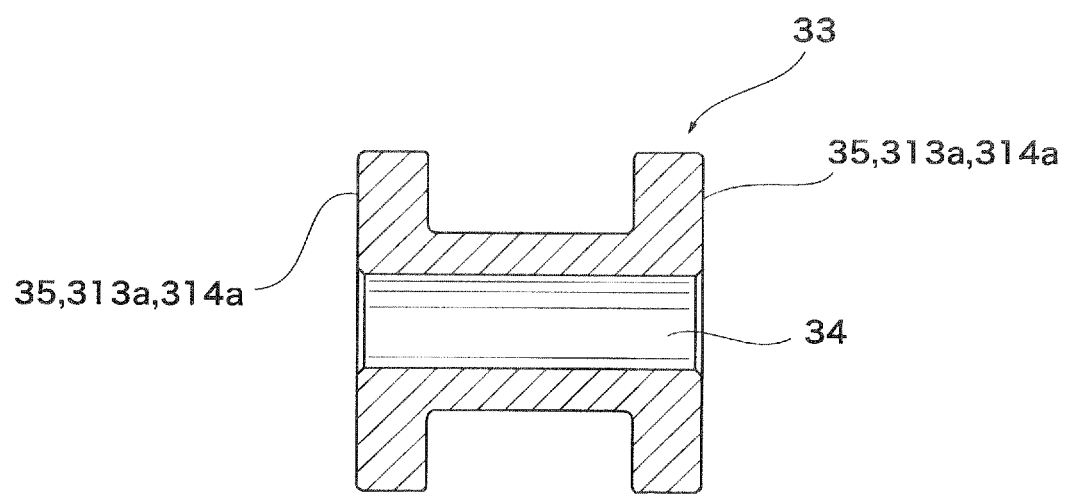
FIG. 7 is a vertical sectional side view of flanges according to the embodiment.

As shown in FIGS. 1 to 9, rollers 33 are attached rotatably on the peripheral surfaces of the pair of support studs 313 and the holddown stud 314 and flanges 313a and 314a are provided at their front and rear ends. As shown in FIG. 7, each roller 33 has a hole 34 through which the stud 313 or 314 are passed and is integral with flanges 35 which serves as the flanges 313a and 314a. The roller 33 is, for example, a resin molded article.

As shown in FIG. 4, the rollers 33 are attached to the studs 313 and 314 through thrust washers SW1, in which they are retained with the bolts B3 tightened into screw holes 36 at the tips of the studs 313 through thrust washers SW2 and washers W3. Consequently the rollers 33 are rotatably fitted to the studs 313 and 314.

Figure 8:
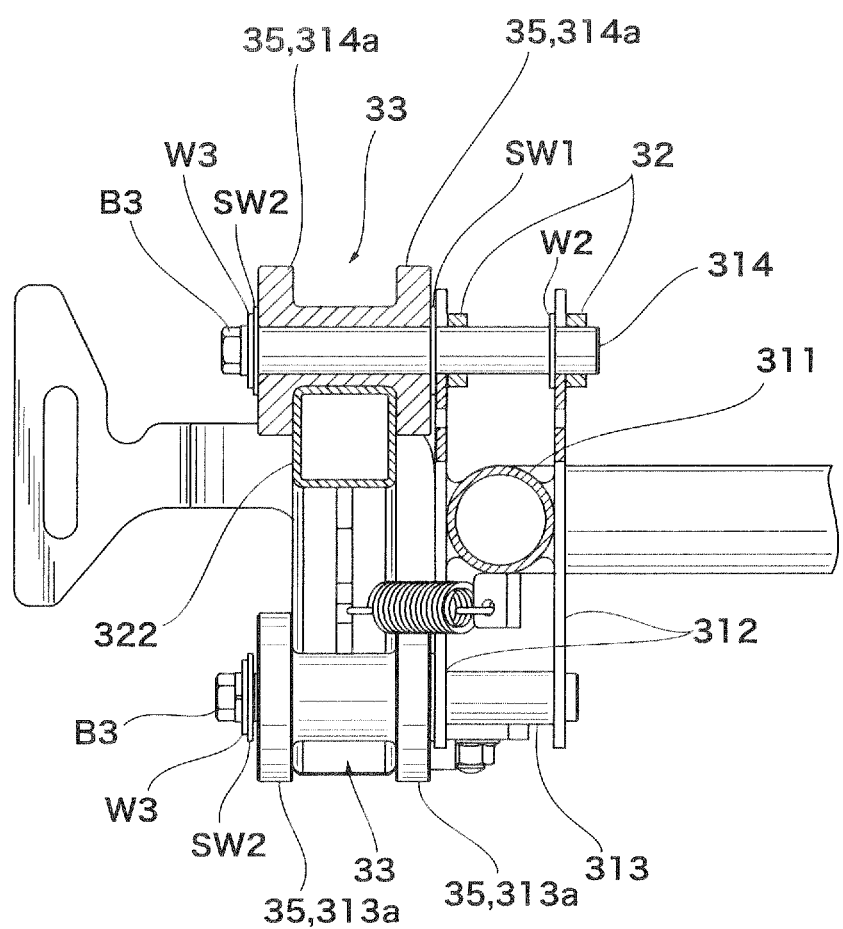
FIG. 8 is a vertical sectional side view of the connection structure including a holddown stud according to the embodiment.
Figure 9:
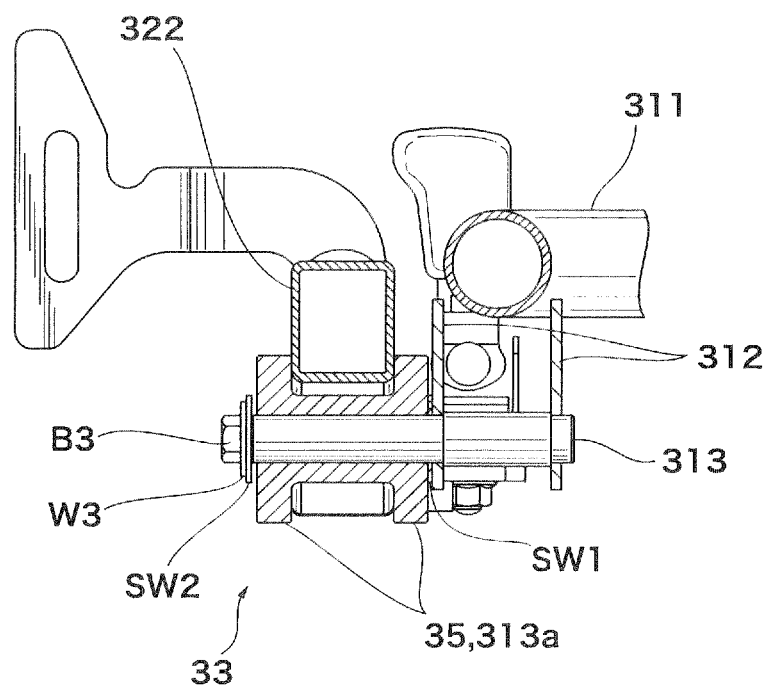
FIG. 9 is a vertical sectional side view of the connection structure including a support stud according to the embodiment.

FIG. 8 shows that rollers 33 are fitted to the pair of support studs 313 and holddown stud 314. FIG. 9 shows that the rollers 33 are fitted to the pair of support studs 313.

Figure 10:
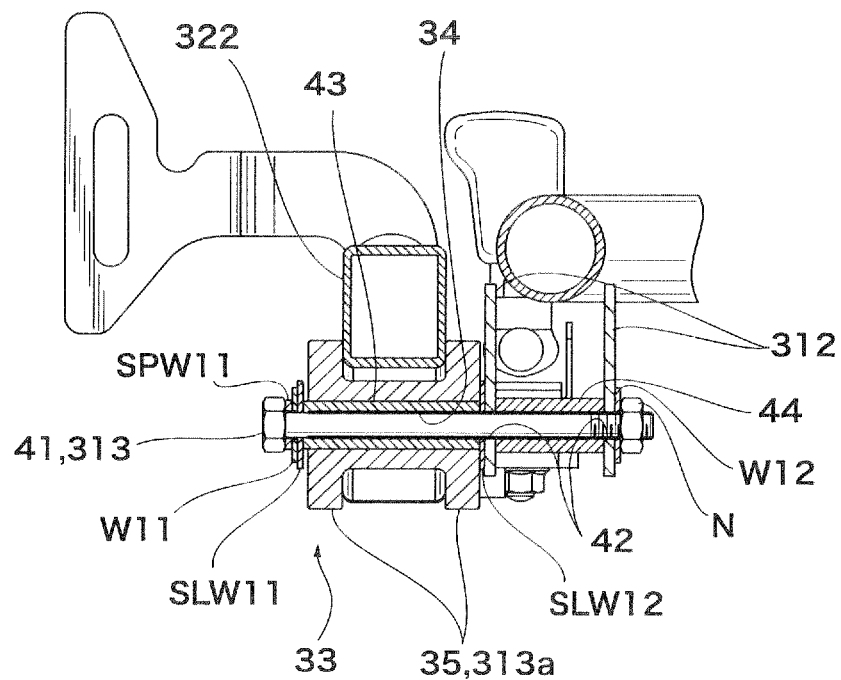
FIG. 10 is a vertical sectional side view of the connection structure including a support bolt, in which a bolt s used as a bar-like connecting member according to the embodiment.

The support studs 313 and holddown stud 314 should be bar-like members but need not be stud pins. For example, bolts may be used as the support studs 313 and holddown stud 314. FIG. 10 shows an example that a bolt 41 is used as support stud 313. The bolt 41 is passed through the hole 34 of the roller 33 through a spring washer SPW11, washer W11 and thrust washer SLW11, and passed through mounting holes 42 made in the pair of lift plates 312 through a thrust washer SLW12 and fixed with a nut N through washer W12. A protective collar 43 is provided between the hole 34 of the roller 33 and the bolt 41, preventing the peripheral thread of the bolt 41 from causing wear of the hole 34. In FIG. 10, 44 denotes a collar fixed between the pair of lift plates 312.

Next, the connection structure 301's portion which is located on the reel cutting unit 201 will be described.

Figure 11:
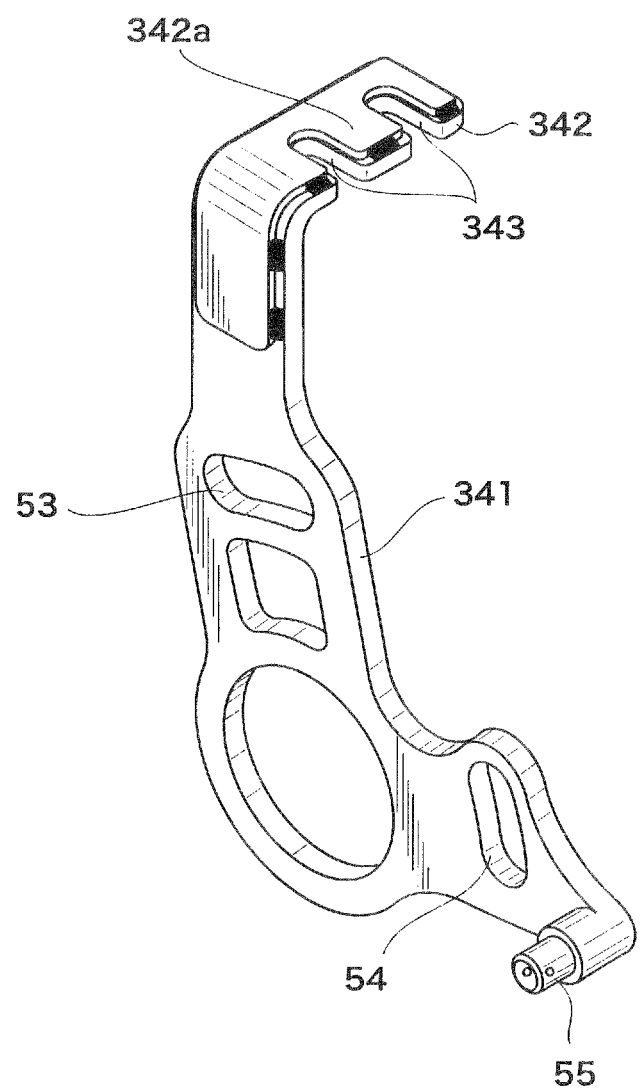
FIG. 11 is a perspective view of a bracket which is detachably attached to a connecting arm according to the embodiment.

As FIGS. 1 to 4 and FIGS. 5A, 5B, and 5C, the reel cutting unit 201 includes a connecting arm 322 with an arc-shaped arc portion 321. The connecting arm 322 is hollow rectangular column member in which a pair of brackets 341 (see FIG. 11 as well) are connected to both its ends through the unit attachment block 401. These brackets 341 are rotatably fitted to the pair of unit frames 213 of the reel cutting unit 201. By connecting the connecting arm 322 to the main body 101, the reel cutting unit 201 is connected to the main body 101.

As shown in FIG. 4, bosses 51 are fixed on the pair of unit frames 213. Each bracket 341 is rotatably fitted to a boss 51 through a washer W31 and retained with a retaining ring 52 through washers W32 and W33. The bracket 341 has two long holes 53 and 54 which limit the range of its rotation with respect to the unit frame 213 (see FIG. 11 as well). Bolts B31 are passed through these long holes 53 and 54 through washers W34 from the back of the unit frame 213. The bolts B31 are secured with nuts N31 through sleeves SL. The sleeves SL are slightly longer than the thickness of the bracket 341.

The members of the main body 101 which are connected to the connecting arm 322 are the pair of support studs 313 fixed on both ends of the lift plates 312 and the holddown stud 314 fixed in the center of the plates. As shown in FIGS. 8 to 10, the connecting arm 322 is connected to the main body 101 by letting the arc portion 321 of the connecting arm 322 rest on the rollers 33 of the pair of support studs 313. Here the roller 33 for the holddown stud 314 fixed on the lift plates 312 prevents the connecting arm 322 from coming off upward and the flanges 313a and 314a on the rollers 33 for the support studs 313 and holddown stud 314 prevent the connecting arm 322 from coming off forward or backward of the lawn mower 11. In this way, the pair of support studs 313 and the holddown stud 314 function as supporters which hold the arc portion 321 slidably and connect it to the main body 101.

As mentioned earlier, the connection structure 301 connects the reel cutting unit 201 to the main body 101 so as to enable pitching and rolling of the unit. It is the rotary connection structure of the brackets 341 for the pair of unit frames 213 that enables pitching of the reel cutting unit 201. It is the supporting structure of the lift plates 312 for the connecting arm 322 that enables rolling of the reel cutting unit 201.

A further explanation is given below of the rolling motion of the reel cutting unit 201. In this embodiment, the important thing is the shape of the arc portion 321 of the connecting arm 322, more specifically the shape of the lower face of the arc portion 321 which is supported by the pair of support studs 313. As the arc portion 321 slides on the pair of support studs 313, the reel cutting unit 201 oscillates along the sliding trajectory which follows the shape of the lower face of the arc portion 321. This oscillation of the unit 201 is rolling motion of the unit 201. In this structure, the shape of the lower face of the arc portion 321 determines the rotation center RA of the reel cutting unit 201 in rolling.

Figure 5A:
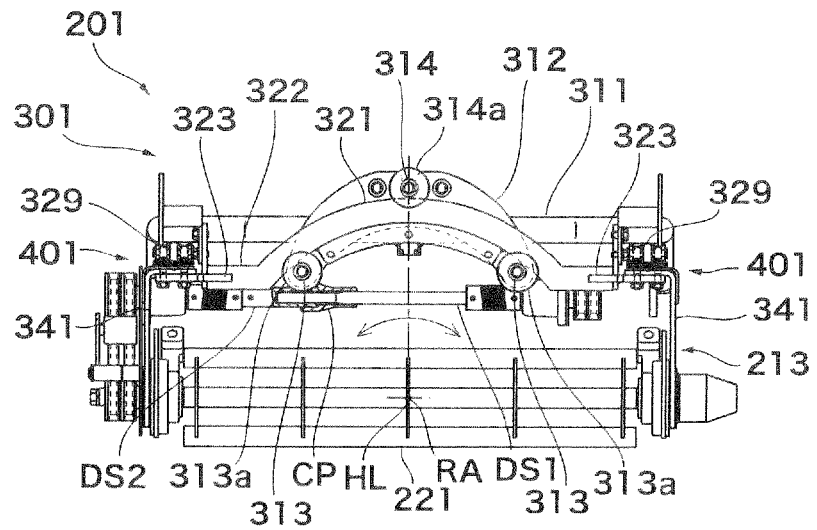
FIG. 5A is a front view of the reel cutting unit connected to the main body according to the embodiment, in which the unit is placed on a flat surface and is not rolling.
Figure 5B:
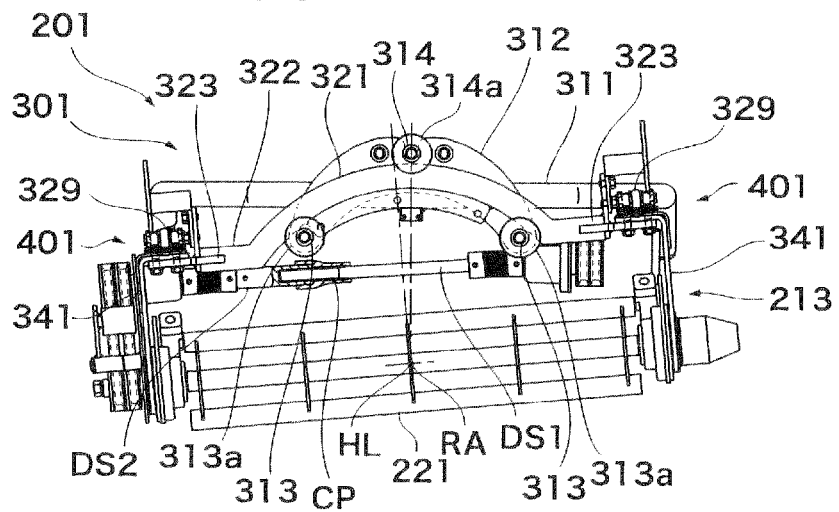
FIG. 5B is a front view of the reel cutting unit connected to the main body according to the embodiment, in which the unit is placed on a surface inclined right up and is rolling.
Figure 5C:
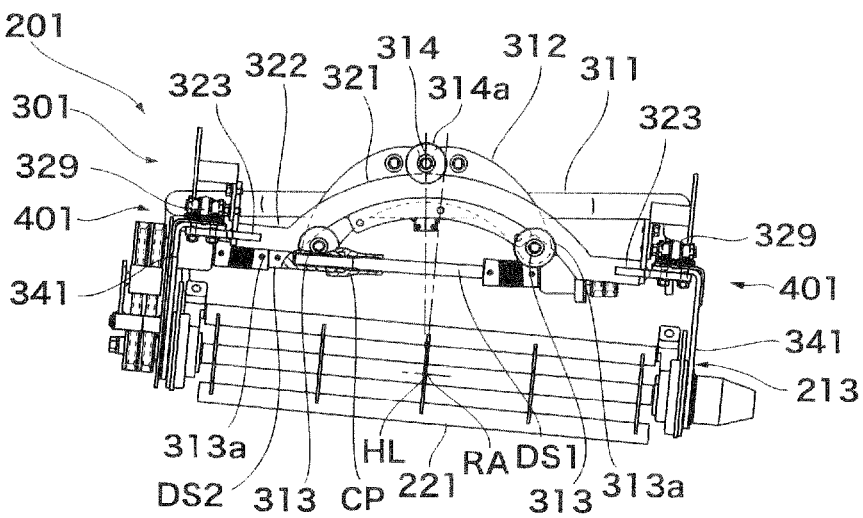
FIG. 5C is a front view of the reel cutting unit connected to the main body according to the embodiment, in which the unit is placed on a surface inclined left up and is rolling.

In this embodiment, as shown in FIG. 5A, the shape of the lower face of the arc portion 321 is determined so as to follow a virtual arc centered on virtual horizontal line HL perpendicular to the shaft center of the cutting reel 221 in the center of the axial direction of the cutting reel 221. Therefore, the reel cutting unit 201 is connected to the main body 101 so as to roll around the virtual, horizontal line HL, namely roll with the virtual horizontal line HL as the rotation center RA (see FIGS. 5A to 5C).

The lawn mower 11 according to this embodiment includes a pair of left and right connecting links 351 for connecting the main body 101 and reel cutting unit 201 in addition to the connection structure 301. As shown in FIGS. 1, 2, and 4, the connecting links 351 are flat-plate link members which connect the left and right front portions of the main body 101 and the left and right rear portions of the reel cutting unit 201. The connecting links 351 are rotatably fitted to the main body 101 and reel cutting unit 201 so as not to hinder pitching and rolling motions of the reel cutting unit 201 with respect to the main body 101. More specifically, as shown in FIG. 4, the connecting links 351 connect stud pins 71 erected on the main body frames 31 of the main body 101 with stud pins 55 erected on the brackets 341. The connecting links 351 are retained on the stud pins 55 and 71 with snap pins SNP.

3. Unit Attachment Block

Next, the unit attachment block 401 will be described referring to FIGS. 1 to 4, FIGS. 5A to 5C and FIGS. 12 to 19.

Figure 12:
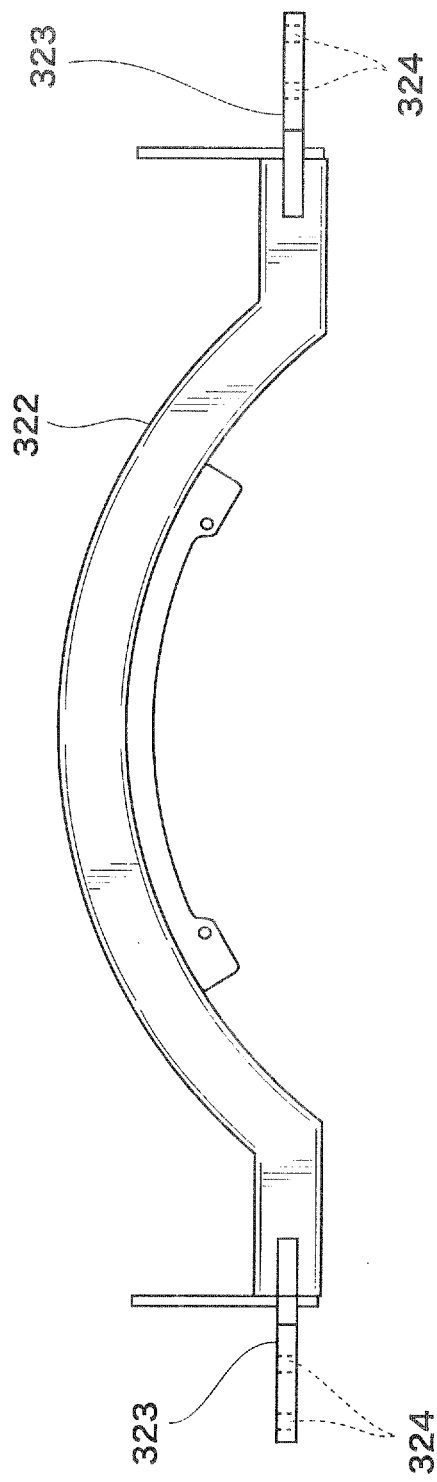
FIG. 12 is a front view of the connecting arm of the reel cutting unit according to the embodiment.
Figure 13:
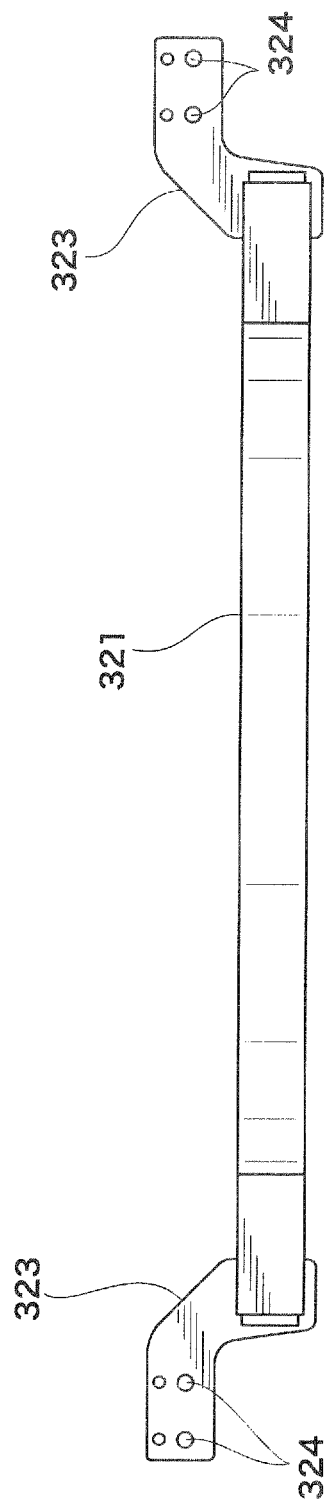
FIG. 13 is a plan view of the connecting arm of the reel cutting unit according to the embodiment.
Figure 14:
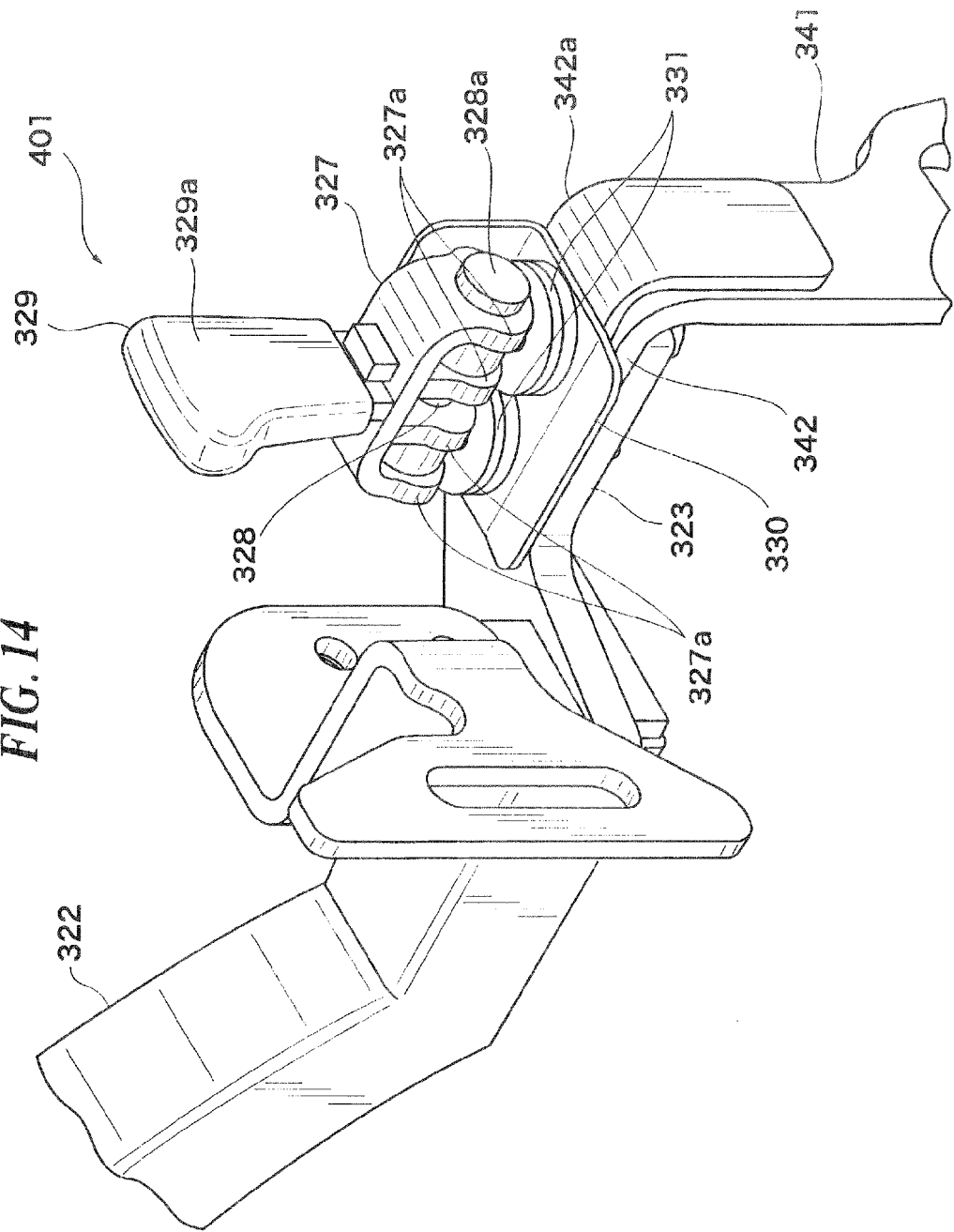
FIG. 14 is an enlarged perspective view of a unit attachment block for detachably connecting the connecting arm of the reel cutting unit and the bracket according to the embodiment.
Figure 15:
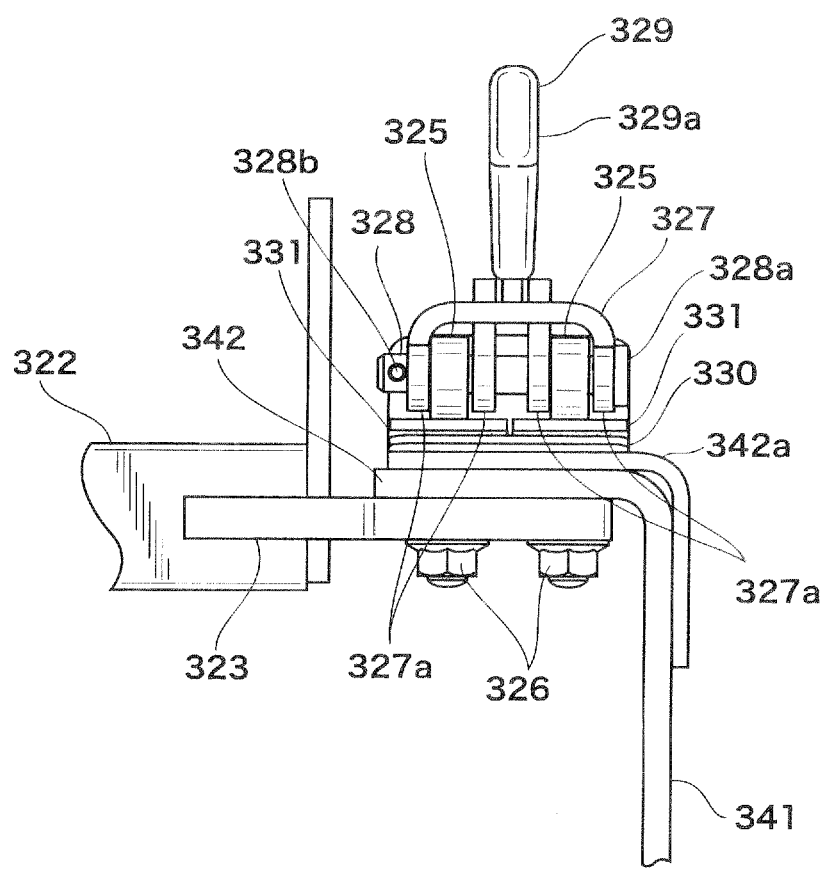
FIG. 15 is an enlarged front view of the unit attachment block according to the embodiment.
Figure 16:
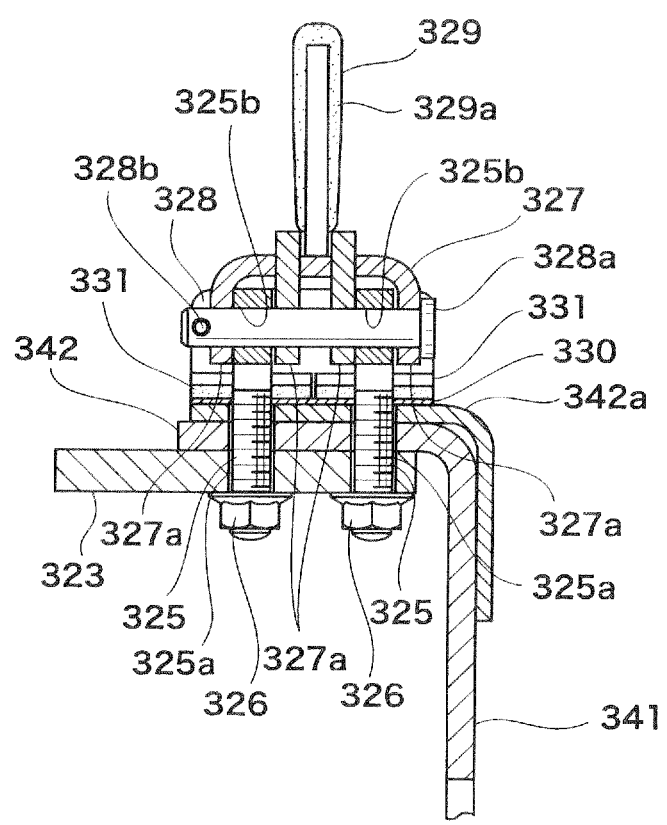
FIG. 16 is an enlarged vertical sectional front view of the unit attachment block according to the embodiment.
Figure 17A:
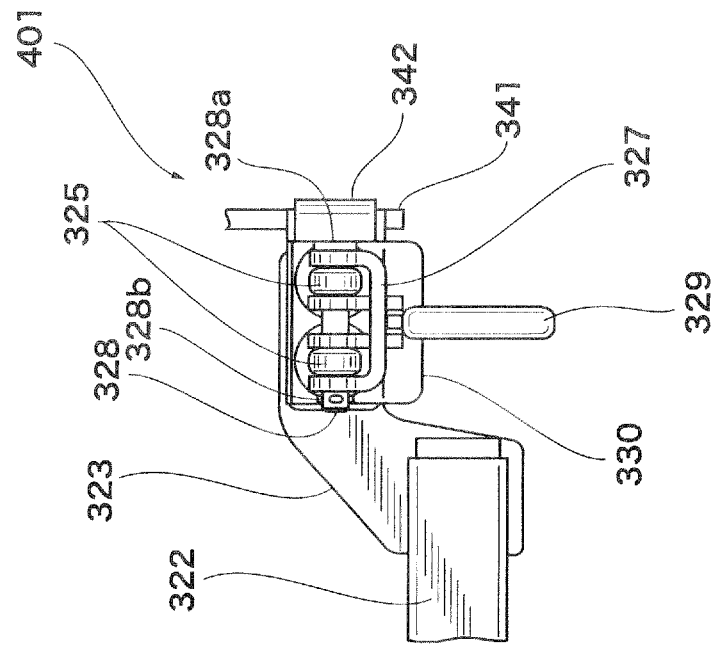
FIG. 17A is a plan view of the unit attachment block according to the embodiment, in which the connecting arm and bracket are separated from each other.
Figure 17B:
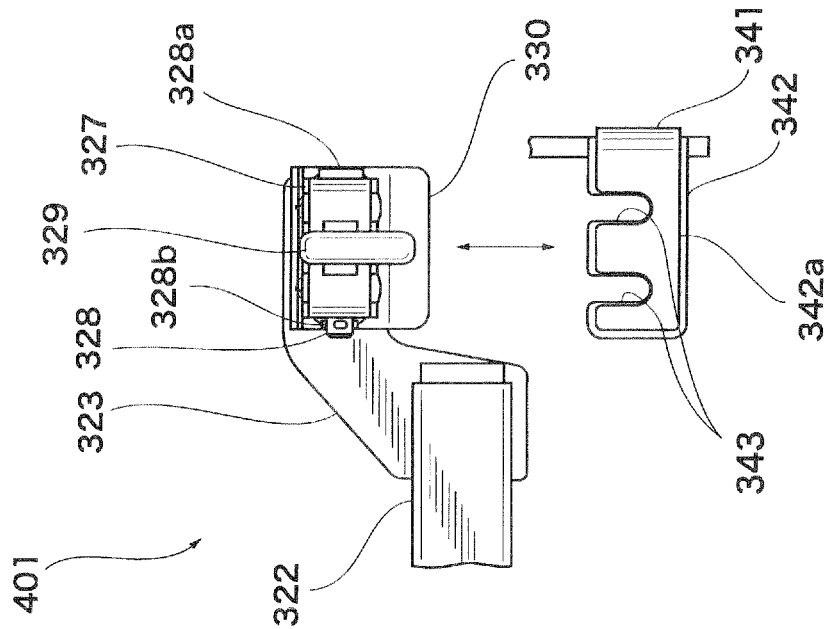
FIG. 17B is a plan view of the unit attachment block according to the embodiment, in which the connecting arm and bracket are connected.
Figure 19:
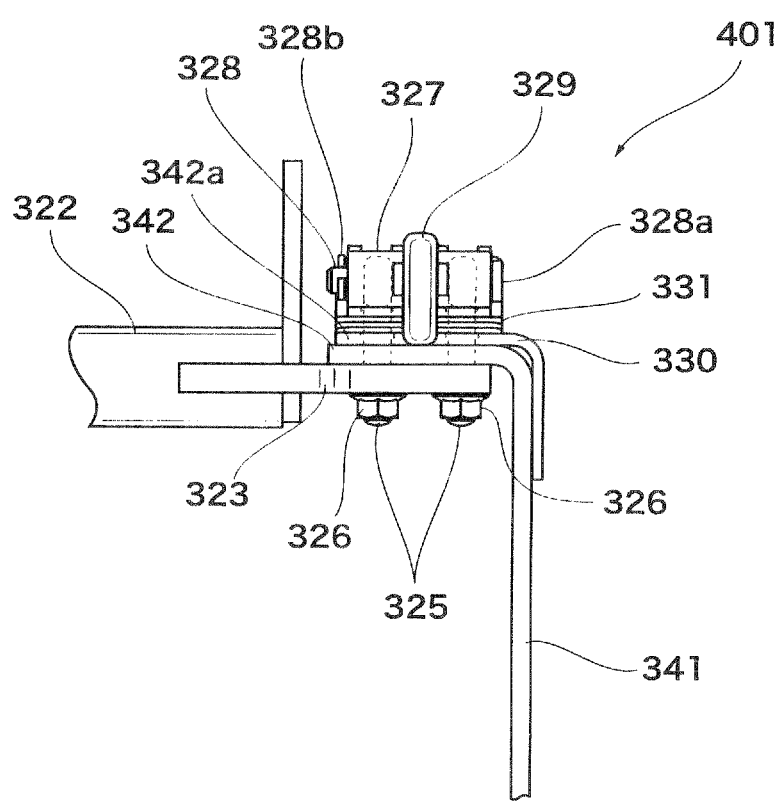
FIG. 19 is a front view of the unit attachment block according to the embodiment, in which the connecting arm and bracket are connected.

As shown in FIGS. 12 and 13, a pair of connecting plates 323 in the form of flat plates placed horizontally are provided at both ends of the connecting arm 322. Each of the connecting plates 323 has two bolt holes 324. The unit attachment block 401 is fixed on the connecting plates 323 using the bolt holes 324.

As shown in FIG. 4 and FIGS. 14 to 19, the unit attachment block 401 is fixed by screwing eyebolts 325 into the two bolt holes 324 respectively from above each connecting plate 323 and fixing them with nuts 326. Here the eyebolt 325 is a bolt with a thread 325a on its tip portion and a hole 325b in its head.

In the unit attachment block 401, a cam 327 is attached to the heads of the two eyebolts 325. The cam 327 is a member so shaped as to sandwich the heads of the two eyebolts 325 with four plate cams 327a and rotatably fitted to the two heads of the eyebolts 325 by inserting a pin 328 into the holes 325b in the heads of the eyebolts 325. In other words, the eyebolts 325 serve as columns for supporting the cam 327 rotatably. The pin 328 is prevented from coming off the cam 327 by a pin head 328a at one end of the pin and a pin stopper 328b at the other end.

The cam 327 has an operation lever 329 covered with rubber 329a and can be rotated 90 degrees to turn the operation lever 329 from its vertical position to its horizontal position (see FIGS. 17A and 17B to FIG. 19). The amount of lift of each plate cam 327a of the cam 327, namely the amount of displacement of the follower, is determined so that it is the minimum when the operation lever 329 is in the vertical position and the maximum when the lever is in the horizontal position.

In the unit attachment block 401, the two eyebolts 325 penetrate a guide plate 330 and pushers 331 which are located between the connecting plate 323 and cam 327. The guide plate 330 is a single member penetrated by the two eyebolts, having an upwardly bent end portion (see FIGS. 14, 18A and 18B). One pusher 331 is provided for one eyebolt 325 and made of metal and rubber. The pusher's portion to abut on the cam 327 is made of a hard material, metal and its portion to abut on the guide plate 330 is made of a soft material, rubber. As shown in FIG. 18A, the guide plate 330 and pusher 331 are lifted by a pair of spring pins (elastic member) 332 provided on the connecting plate 323, producing a gap between the guide plate 330 and connecting plate 323. The pair of spring pins 332 is located so that it is hidden behind the eyebolt 325 when the unit attachment block 401 is seen frontally.

Each of the pair of brackets 341 attached to the unit frames 213 has a top end portion which is orthogonally bent inward and serves as a connecting portion 342 (FIGS. 4 and 5A to 5C and FIGS. 14 to 19). These connecting portions 342 are designed to be attached to the unit attachment blocks 401 in order to connect the connecting arm 322 and the brackets 341. More specifically in the unit attachment block 401, each connecting portion 342 inserted between the connecting plate 323 and guide plate 330 and attached to an end of the connecting arm 322. The connecting portion has two fitting grooves 343 which prevent the two eyebolts 325 from interfering with the connecting portion 342 and enable the eyebolts 325 to determine its position (see FIGS. 4 and 5A to 5C and FIG. 17A). These fitting grooves 343 are arranged at an interval which matches the interval between the two eyebolts 325. The connecting portion 342 is reinforced by a reinforcing member 342a fixed on the outside of its orthogonally bent portion.

To attach the reel cutting unit 201 to the main body 101, the two eyebolts 325 are fitted into the two fitting grooves 343 and the connecting portion 342 is inserted between the connecting plate 323 and the guide plate 330. The direction of insertion is the direction from the front of the lawn mower 11 to its rear (the direction of insertion and removal of the connecting portion 342 is indicated by arrows in FIGS. 17A and 18A). Then, the operation lever 329 in its vertical position is turned down to the horizontal position (see FIGS. 17B and 18B).

Consequently the cam 327 pushes the guide plate 330 through the pushers 331 so that the connecting portion 342 is fixed between the connecting plate 323 and the guide plate 330 and the attachment of the reel cutting unit 201 to the main body 101 is thus completed (see FIGS. 1 to 5, FIGS. 17B, 18B, and 13).

To detach the reel cutting unit 201 from the main body 101, turn up the operation lever 329 of the unit attachment block 401 to its vertical position (see FIGS. 14 to 16 and FIGS. 17A and 18A). Consequently the guide plate 330 is separated from the connecting plate 323 and the connecting portion 342 between the connecting plate 323 and the guide plate 330 is released. Thus the reel cutting unit 201 is ready to be detached from the main body 101.

As explained so far, as a member which connects or disconnects the main body and the reel cutting unit, the unit attachment block 401 includes the connecting portion 342, the connecting plate 323 and guide plate 330 as a pair of pinching parts for sandwiching the connecting portion 342 in a way that they can be attached and detached in a direction parallel to the running direction of the lawn mower 11. The distance between the connecting plate 323 and guide plate 330 as a pair of pinching parts is changed using the cam 327 manually operable with the operation lever 329 to control whether the connecting portion 342 is sandwiched by the connecting plate 323 and guide plate 330 or released. At this time, the cam 327 functions as a driver and the guide plate 330 functions as a follower.

As mentioned earlier, the cutting reel 221 and working roller 233 of the reel cutting unit 201 are rotated by motive power transmitted from the engine 111, which means that a power transmission system exists between the engine 111 and the cutting reel 221 and working roller 233. Therefore, in order for the reel cutting unit 201 to be attached to, or detached from, the main body 101, engagement or disengagement of the power transmission system is required. For this purpose, this embodiment adopts a structure which detachably connects a driving power transmission shaft DS1 of the main body 101 and a driven power transmission shaft DS2 of the reel cutting unit 201 through a coupling CP. The driving power transmission shaft DS1 is shaft which rotates by motive power transmitted from the engine 111 and the driven power transmission shaft DS2 is a shaft which is located coaxially with the driving power transmission shaft DS1 and can transmit the torque to the cutting reel 221 and working roller 233. The coupling CP is a member made of a flexible between the driving power transmission shaft DS1 and driven power transmission shaft DS2 to enable power transmission even when the driven power transmission shaft DS2 is inclined with respect to the driving power transmission shaft DS1. Therefore, even when the reel cutting unit 201 is rolling, motive power from the engine 11 is transmitted to the cutting reel 221 and working roller 233 without trouble.

4. Operation (1) Basic Operation

As the engine switch 137 is turned on to start the engine 111 and the main clutch lever 138 is switched to transmit the power from the engine 111 to the pair of drive rollers 121, the lawn mower 11 runs automatically. The operator can control the running direction of the lawn mower 11 by holding the left and right grips 133 of the handle 131 and adjusting the forces applied to them. Also the operator can control the speed by adjusting the degree of opening of the throttle lever 135 and apply the brake by using the brake lever 136.

While the lawn mower 11 is running, the cutting reel 221 and working roller 233 can be rotated by switching the cutting reel clutch lever 139 to transmit the power from the engine 111 to the cutting reel 221 and working roller 233. When the working roller 233 rotates, it removes dead grass, uniforms the grain of grass and sends the grass to the cutting reel 221. When the cutting reel 221 rotates, it engages with the bedknife 222 and mows the lawn. Thus, lawn mowing by the lawn mower 11 is performed.

(2) Grass Cutting Height and Lapping

In lawn mowing, the clearance between the ground surface GR and the cutting reel 221 can be adjusted as appropriate by controlling the height of the front roller 231. The height of grass cutting by the cutting reel 221 and bedknife 222 depends on the size of the clearance. The grass cutting height is generally about 2.0 to 5.0 mm on a golf course green. When the cutting height is smaller, the green becomes a so-called "fast green" on which the ball rolls more easily, and conversely when the cutting height is larger, the green is a so-called "slow green" on which the ball rolls less easily.

In golf, the speed of the green considerably affects how enjoyable putting is and how interesting it is as a game. The speed of the green is not always determined only by the grass cutting height but the grass cutting height is an important determinant factor for the speed of the green. In a golf course, it is very important to set the grass cutting height. On the other hand, the lawn grass grows everyday. Therefore, lawn mowing must be done everyday to maintain the green. For a fast green, it is not uncommon to mow the lawn twice a day. Thus the cutting reel 221 quickly wears and becomes dull. In order to ensure its cutting sharpness, lapping is indispensable.

However, as lapping is repeated, the diameter of the cutting reel 221 gradually decreases and finally reaches the lower limit for use. This decrease in the diameter of the cutting reel 221 causes change in its contact pressure with the bedknife 222, leading to deterioration in the grass cutting sharpness.

For this reason, it becomes necessary to adjust the contact pressure of the bedknife 222 with the cutting reel 221 to cope with the decrease in the diameter of the cutting reel 221. By such adjustment, the contact pressure of the bedknife 22 with the cutting reel 221 can be optimized to keep the cutting sharpness.

(3) Bite into the Sod

Next, how the cutting reel 221's bite into the sod is prevented will be described. The reel cutting unit 201 is connected to the main body 101 through the connection structure 301 so that it can roll or pitch. While the lawn mower 11 is running, the reel cutting unit 201 pitches or rolls according to the undulation of the ground surface GR (see FIGS. 20A to 20C).

As mentioned above, in a conventional lawn mower, rolling of the reel cutting unit 201 causes the cutting reel 221 to bite into the sod. The lawn mower 11 according to this embodiment can reliably prevent such a bite into the sod. The reason is as follows.

As shown in FIGS. 5A to 5C and FIGS. 20A to 20C, the reel cutting unit 201 rolls around the virtual horizontal line HL perpendicular to the shaft center of the cutting reel 221 in the center of the axial direction of the cutting reel 221, namely with the virtual horizontal line HL as the rotation center RA. Therefore, even when the ground surface FR is inclined right upward (see FIG. 20B) or left upward (FIG. 20C), a phenomenon that the pair of rollers of the reel cutting unit 201 (front roller 231 and rear roller 232) break into the ground surface GR in a transversely unbalanced manner will not occur. This is because while the reel cutting unit 201 is rolling, it does not move upward or downward of the inclined ground surface GR.

This motion of the reel cutting unit 201 scarcely changes even when the diameter of the cutting reel 221 is decreased by lapping. The reason is as follows: when the lawn mower 11 is in its initial state, the rotation center RA of the reel cutting unit 201 is on the virtual horizontal line HL perpendicular to the shaft center of the cutting reel 221, so even if the rotation center RA goes down by the amount equivalent to the decrease in the diameter of the cutting reel 221, the rotation center RA of the reel cutting unit 201 remains within the cutting reel 221.

As a consequence, in the lawn mower 11 according to this embodiment, even when the reel cutting unit 201 rolls according to the undulation of the ground surface GR, the clearance between the ground surface GR and the cutting reel 221 can be kept at a preset value regardless of the position of the cutting reel 221. Therefore, bite S into the sod attributable to rolling of the reel cutting unit 201 can be reliably prevented.

(4) Structure which Determines the Rotation Center of the Reel Cutting Unit

In this embodiment, the connection structure 301 determines the rotation center of the reel cutting unit 201. The connection structure 301 includes a connecting arm 322 and support parts (support studs 313 and holddown stud 314). The connecting arm 322, located on the reel cutting unit 201, includes an arc portion 321 shaped so as to follow a virtual arc centered on the virtual horizontal line HL. The support parts (support studs 313 and holddown stud 314), located on the main body 101, support the arc portion 321 slidably and connect it to the main body 101. Due to this structure, the rotation center of the reel cutting unit 201 can be set to a desired position easily.

In this embodiment, the upper and lower faces of the arc portion 321 both have a shape which follows the virtual arc centered on the virtual horizontal line HL and the lower face of the arc portion 321 is supported by the pair of support studs 313 and the upper face of the arc portion 321 is held down by the holddown stud 314. In addition, the pair of support studs 313 and holddown stud 314 are provided with flanges 313a and 314a respectively to prevent the arc portion 321 from coming off horizontally. Consequently the structure which determines the rotation center of the reel cutting unit 201 can be simplified.

(5) Attachment/Detachment of the Reel Cutting Unit

Next, attachment and detachment of the reel cutting unit 201 will be described.

(a) Basic Operation

According to this embodiment, the unit attachment block 401 allows detachment of the reel cutting unit 201 from the main body 101 for maintenance of the lawn mower 11. After maintenance is over, the reel cutting unit 201 is attached to the main body 101 again. The connection and disconnection of the main body 101 and the reel cutting unit 201 can be performed by a simple operation of the operation lever 329 very efficiently.

More specifically, the distance between the pair of pinching parts (connecting plate 323 and guide plate 330) is changed by the manually operable cam 327 in the unit attachment block 401 using the operation lever 329 to control whether the pair of pinching parts hold or release the connecting portion 342. As mentioned above, when the operation lever 329 is down in its horizontal position, the connecting portion 342 is held between the pinching parts (see FIGS. 17B, 18B, and 19) and when the operation lever 329 is up in its vertical position, the connecting portion 342 is released (see FIGS. 14 to 16, FIGS. 17A and 18A). When the connecting portion 342 is released, the connecting portion 342 can be pulled out or inserted and the reel cutting unit 201 can be removed from the main body 101. Thus the main body 101 and the reel cutting unit 201 can be connected or disconnected simply by turning the operation lever 329.

Furthermore, the direction in which the connecting portion 342 is pulled out from, or inserted into, between the connecting plate 323 and guide plate 330 as a pair of pinching parts is a horizontal direction (parallel to the running direction of the lawn mower 11). This direction coincides with the direction of movement of the reel cutting unit 201 with respect to the main body 101. For this reason, insertion or removal of the connecting portion can be done very efficiently.

Therefore, according to this embodiment, the reel cutting unit 201 can be easily attached to, or detached from, the main body 101 and maintenance of the reel cutting unit 201 is easy.

(b) Arrangement of a Pair of Pinching Parts and the Connecting Portion

In this embodiment, the pair of pinching parts (connecting plate 323 and guide plate 330) and the cam 327 are located on the main body 101 and the connecting portion 342 is located on the reel cutting unit 201. This means that when the reel cutting unit 201 is attached or detached, at the same time the connecting portion 342 is removed or inserted together with the reel cutting unit 201. Therefore, the operator can insert or remove the connecting portion 342 while looking at the clearance between the connecting plate 323 and guide plate 330, so that the removal or insertion work can be done efficiently.

In this embodiment, the pair of pinching parts (connecting plate 323 and guide plate 330) are located in a way to sandwich the connecting portion 342 vertically. This increases the tolerance of misalignment between the main body 101 and the reel cutting unit 201 in a horizontal direction perpendicular to the running direction of the lawn mower 11 when the connecting portion 342 is inserted into between the connecting plate 323 and guide plate 330, thereby ensuring high efficiency in the insertion work.

More specifically, the above arrangement of the pair of pinching parts (connecting plate and guide plate 330) and the connecting portion 342 is implemented as follows:

One of the pinching parts is the connecting plate 323 which is located on the main body 101 and placed horizontally;

The other pinching part is the guide plate 330 which can be moved vertically to come close to, or go away from, the connecting plate 323;

The driver of the cam 327 is the plate cams 327a which rotate around a horizontal axis perpendicular to the running direction of the lawn mower 11 to displace the guide plate; and The connecting portion 342 is located on the reel cutting unit 201.

(c) Plate Cams

In this embodiment, the plate cams 327a are rotatably attached to the eyebolts 325 (columns) which are fixed on the connecting plate 323, penetrating the guide plate 330. This realizes a simple compact structure for supporting the plate cams 327a.

In this embodiment, a plurality of eyebolts 325 (columns) are located on a horizontal line perpendicular to the running direction of the lawn mower 11 and these eyebolts 325 penetrate the guide plate 330, in which plate cams 327a are provided for each eyebolt 325 and the plate cams and eyebolts are united. Consequently, a plurality of points of pressure against the guide plate 330 are produced by the cam 327, so the connecting portion 342 is more stably held between the pair of pinching parts (connecting plate 323 and guide plate 330).

(d) Fitting Grooves

In this embodiment, the connecting portion 342 has fitting grooves 343 which fit the eyebolts 325 (columns). Consequently the main body 101 and the reel cutting unit 201 can be easily aligned with each other in the horizontal direction perpendicular to the running direction of the lawn mower 11, thereby ensuring high efficiency in the alignment work.

(e) Pushers

In this embodiment, pushers 331, which are penetrated by the eyebolts 325 (columns), are provided between the plate cams 327a and the guide plate 330. Each pusher 331 includes a hard member to abut on the plate cams 327a and a soft member to abut on the guide plate 330, in which the hard and soft members are bonded together. Consequently the force required to turn down the operation lever 329 to its horizontal position for the pair of pinching parts (connecting plate 323 and guide plate 330) to sandwich the connecting portion 342 is reduced, thereby ensuring high efficiency in the lever operation.

(f) Spring Pins (Elastic Member) and the Bent Portion of the Guide Plate

In this embodiment, the pair of spring pins 332 as an elastic member is placed between the connecting plate 323 and the guide plate 330. This produces a clearance between the connecting plate 323 and the guide plate 330, thereby making it easy to insert the connecting portion 342 into between the connecting plate 323 and the guide plate 330.

In this embodiment, the guide plate 330's end portion designed to receive the connecting portion 312 being inserted is bent in a way to go away from the guide plate 323. This also makes it easy to insert the connecting portion 342 into between the connecting plate 323 and the guide plate 330.

(g) A Pair of Unit Attachment Blocks

In this embodiment, a pair of left and right unit attachment blocks 401 are provided on the reel cutting unit 201. This stabilizes the connection between the main body 101 and the reel cutting unit 201.

5. Variations

This embodiment has been so far described as a preferred embodiment of the invention. When the reel lawn mower 11 according to this embodiment is implemented actually, obviously various modifications and alterations thereof are possible.

(1) Variations of the Connection Structure

In this embodiment, the connection structure 301 is a structure which connects the reel cutting unit 201 to the main body 101 so that the unit rolls around the rotation center RA as the virtual horizontal line HL perpendicular to the shaft center of the cutting reel 221 in the center of the axial direction of the cutting reel 221. However, the rotation center RA of the reel cutting unit 201 need not be strictly so. For example, the reel cutting unit 201 may be connected to the main body 101 so that it rolls around a rotation center RA slightly above, or below the virtual horizontal line HL perpendicular to the shaft center of the cutting reel 221. As another example, the reel cutting unit 201 may be connected to the main body 101 so that it rolls around a rotation center RA as a virtual line slightly incur by a certain angle with respect to the virtual horizontal line HL. In other words, any structure may be adopted to connect the reel cutting unit 201 to the main body 101 as far as it allows the reel cutting unit 201 to roll around a rotation center as a virtual center point which is in a vertical projection plane covering the cutting reel 221 with a diameter reduced to the limit for use by lapping and is located in the center of the axial direction of the cutting reel 221.

The connection structure 301 may be varied or modified in other various ways.

(2) Variations of the Unit Attachment Block

In this embodiment, the unit attachment block 401 includes a pair of pinching parts (connecting plate 323 and guide plate 330) and a cam 327 which are located on the main body 101, and a connecting portion 342 on the reel cutting unit 201 as described above. However, it is also acceptable that the pair of pinching parts (connecting plate 323 and guide plate 330) are located on the reel cutting unit and the connecting portion 342 is located on the main body 101.

Alternatively the pair of pinching parts (connecting plate 323 and guide plate 330) may be located so as to sandwich the connecting portion 342 not vertically but obliquely with respect to the vertical direction or horizontally.

The unit attachment block 401 may be varied or modified in other various ways.

(3) Others

Although this embodiment includes connecting links 351, actually the connecting links 351 may be omitted. If that is the case, the reel cutting unit 201 can be attached to, or detached from, the main body 101 more easily.

The reel lawn mower according to this embodiment may be used for lawn mowing not only on a green of a golf course but also on a teeing ground, fairway, semi-rough, rough or collar around the green. In addition, it may be used not only for lawn mowing in a golf course but also for lawn mowing in gardens, squares and other places.

Obviously, numerous modifications and variations of the present invention are possible in light of the above description of the present invention. It is therefore to be understood that within the scope of the appended claims, the invention may be practiced otherwise than as specifically described herein.

What is claimed is:

1. A reel lawn mower comprising:
   a main body of which a running direction is determined;
   a reel cutting unit connected to the main body and located on a front side in the running direction;
   a pair of rollers which are located on the reel cutting unit rotatably around a horizontal axis perpendicular to the running direction, to support the reel cutting unit at front and rear positions thereof in the running direction;
   a spiral cutting reel which is located on the reel cutting unit between the pair of rollers rotatably around the horizontal axis perpendicular to the running direction;
   a bedknife which is located on the reel cutting unit and touches the cutting reel under rotation and mows a lawn together with the cutting reel; and
   a connection structure which connects the reel cutting unit to the main body, wherein the reel cutting unit is rollable around a virtual center point which is in a vertical projection plane covering the cutting reel with a minimum usable diameter and located in a center of an axial direction of the cutting reel, as a rotation center;
   wherein the connection structure includes a unit attachment block, as a member for connecting or disconnecting the main body and the reel cutting unit, which includes a connecting portion and a pair of pinching parts for sandwiching the connecting portion so that the connecting portion can be pulled out or inserted in a direction parallel to the running direction, and
   wherein a distance between the pair of pinching parts is changed using a manually operable driver of a cam to control whether the connecting portion is sandwiched or released by the pair of pinching parts.

2. The reel lawn mower according to claim 1, wherein the connection structure includes a connecting arm which is located on the reel cutting unit and includes an arc portion shaped so as to follow a virtual arc centered on a virtual horizontal line parallel to the running direction passing through the virtual center point, and support parts which are located on the main body to support the arc portion slidably and connect the arc portion to the main body.

3. The reel lawn mower according to claim 2,
wherein both an upper face and a lower face of the arc portion are shaped so as to follow the virtual arc; and
wherein the support parts include a pair of bar-like members for supporting the lower face of the arc portion and a bar-like member for holding the upper face of the arc portion down.

4. The reel lawn mower according to claim 3, wherein the bar-like members include flanges for preventing the arc portion from coming off the bar-like members horizontally.

5. The reel lawn mower according to claim 3, wherein the bar-like members are bolts.

6. The reel lawn mower according to claim 3, wherein the bar-like members are stud pins.

7. The reel lawn mower according to claim 3, wherein the bar-like members have a roller which rotatably touches the arc portion.

8. The reel lawn mower according to claim 1, wherein the virtual center point is on a shaft of the cutting reel.

9. The reel lawn mower according to claim 1, wherein the pair of pinching parts and the cam are located on the main body and the connecting portion is located on the reel cutting unit.

10. The reel lawn mower according to claim 1, wherein the pair of pinching parts sandwich the connecting portion vertically.

11. The reel lawn mower according to claim 1,
wherein one of the pair of pinching parts is a connecting plate located on the main body and placed horizontally;
wherein the other pinching part is a guide plate which can be moved vertically to come close to, or go away from, the connecting plate;
wherein the driver of the cam is a plate cam which rotates around a horizontal axis perpendicular to the running direction to displace the guide plate; and
wherein the connecting portion is located on the reel cutting unit.

12. The reel lawn mower according to claim 11, wherein the plate cam is rotatably attached to a column fixed on the connecting plate, penetrating the guide plate.

13. The reel lawn mower according to claim 12,
wherein a plurality of the columns are provided on a horizontal line perpendicular to the running direction;
wherein the columns penetrate the guide plate; and
wherein the plate cam is provided for each of the columns and the cam and column are united.

14. The reel lawn mower according to claim 12, wherein the connecting portion has a fitting groove which fits the column.

15. The reel lawn mower according to claim 12, wherein between the plate cam and the guide plate, a pusher is provided which is penetrated by the column and includes a hard member to abut on the plate cam and a soft member to abut on the guide plate, the hard and soft members being bonded together.

16. The reel lawn mower according to claim 11, wherein a graspable operation lever is fixed on the plate cam.

17. The reel lawn mower according to claim 11, wherein an elastic member is provided between the connecting plate and the guide plate.

18. The reel lawn mower according to claim 11, wherein an end of the guide plate to receive the connecting portion being inserted is bent so as to go away from the guide plate.

19. The reel lawn mower according to claim 1, wherein the unit attachment block is provided on each of left and right sides of the reel cutting unit.

* * * * *

UNITED STATES PATENT AND TRADEMARK OFFICE
CERTIFICATE OF CORRECTION

| | |
|---|---|
| PATENT NO. | : 9,027,318 B2 |
| APPLICATION NO. | : 13/759275 |
| DATED | : February 5, 2013 |
| INVENTOR(S) | : Kazunari Akahane |

Page 1 of 1

It is certified that error appears in the above-identified patent and that said Letters Patent is hereby corrected as shown below:

Column 1, line 12, delete "P2012-14031" and insert --P2012-140316--.

Signed and Sealed this
Ninth Day of August, 2016

Michelle K. Lee
*Director of the United States Patent and Trademark Office*